United States Patent
Tomes et al.

(10) Patent No.: US 12,467,365 B1
(45) Date of Patent: Nov. 11, 2025

(54) IN SITU BALANCING MASS(ES) FOR AIRCRAFT POWERPLANT

(71) Applicant: Pratt & Whitney Canada Corp., Quebec (CA)

(72) Inventors: Nathan Tomes, Hamilton (CA); Tyler Richardson, Toronto (CA); Dave Menheere, Norval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/038,559

(22) Filed: Jan. 27, 2025

(51) Int. Cl.
*F01D 5/02* (2006.01)
*F04D 29/66* (2006.01)
*F16F 15/32* (2006.01)

(52) U.S. Cl.
CPC ............ *F01D 5/027* (2013.01); *F04D 29/662* (2013.01); *F05D 2220/323* (2013.01); *F05D 2260/15* (2013.01); *F05D 2260/31* (2013.01); *F05D 2260/38* (2013.01); *F16F 15/32* (2013.01)

(58) Field of Classification Search
CPC .......... F01D 5/027; F01D 5/10; F04D 29/662; F04D 29/668; F16F 15/32
See application file for complete search history.

(56) References Cited

U.S. PATENT DOCUMENTS

| | | | |
|---|---|---|---|
| 5,167,167 A * | 12/1992 | Tiernan, Jr. ............. | F16F 15/32 73/470 |
| 5,582,077 A * | 12/1996 | Agram ..................... | F16F 15/32 403/348 |
| 6,588,298 B2 * | 7/2003 | Czerniak ................. | F01D 5/027 73/470 |
| 8,122,785 B2 * | 2/2012 | Czerniak ................. | F01D 5/027 74/572.4 |
| 9,297,258 B2 | 3/2016 | Woods | |
| 11,643,931 B2 | 5/2023 | Pellerin | |
| 11,746,657 B2 * | 9/2023 | Auduberteau ............ | F01D 5/10 415/119 |
| 2002/0134191 A1 * | 9/2002 | Czerniak ................. | F16F 15/34 416/145 |
| 2003/0213334 A1 * | 11/2003 | Czerniak ................. | F01D 5/027 416/145 |

* cited by examiner

*Primary Examiner* — Courtney D Heinle
*Assistant Examiner* — Behnoush Haghighian
(74) *Attorney, Agent, or Firm* — Getz Balich LLC

(57) ABSTRACT

An aircraft powerplant apparatus includes a rotating structure configured to rotate about an axis. The rotating structure includes a bladed rotor, a first component, a second component, a first balancing mass, a second balancing mass and a spring element. The first balancing mass and the second balancing mass are configured to rotationally balance the rotating structure about the axis. The first component include a plurality of first component teeth. The second component includes a plurality of second component teeth. The first balancing mass includes a first mass ring and a plurality of first mass teeth. The first mass teeth are meshed with the first component teeth. The second balancing mass includes a second mass ring and a plurality of second mass teeth. The second mass teeth are meshed with the second component teeth. The spring element is engaged with the first balancing mass and the second balancing mass.

20 Claims, 14 Drawing Sheets

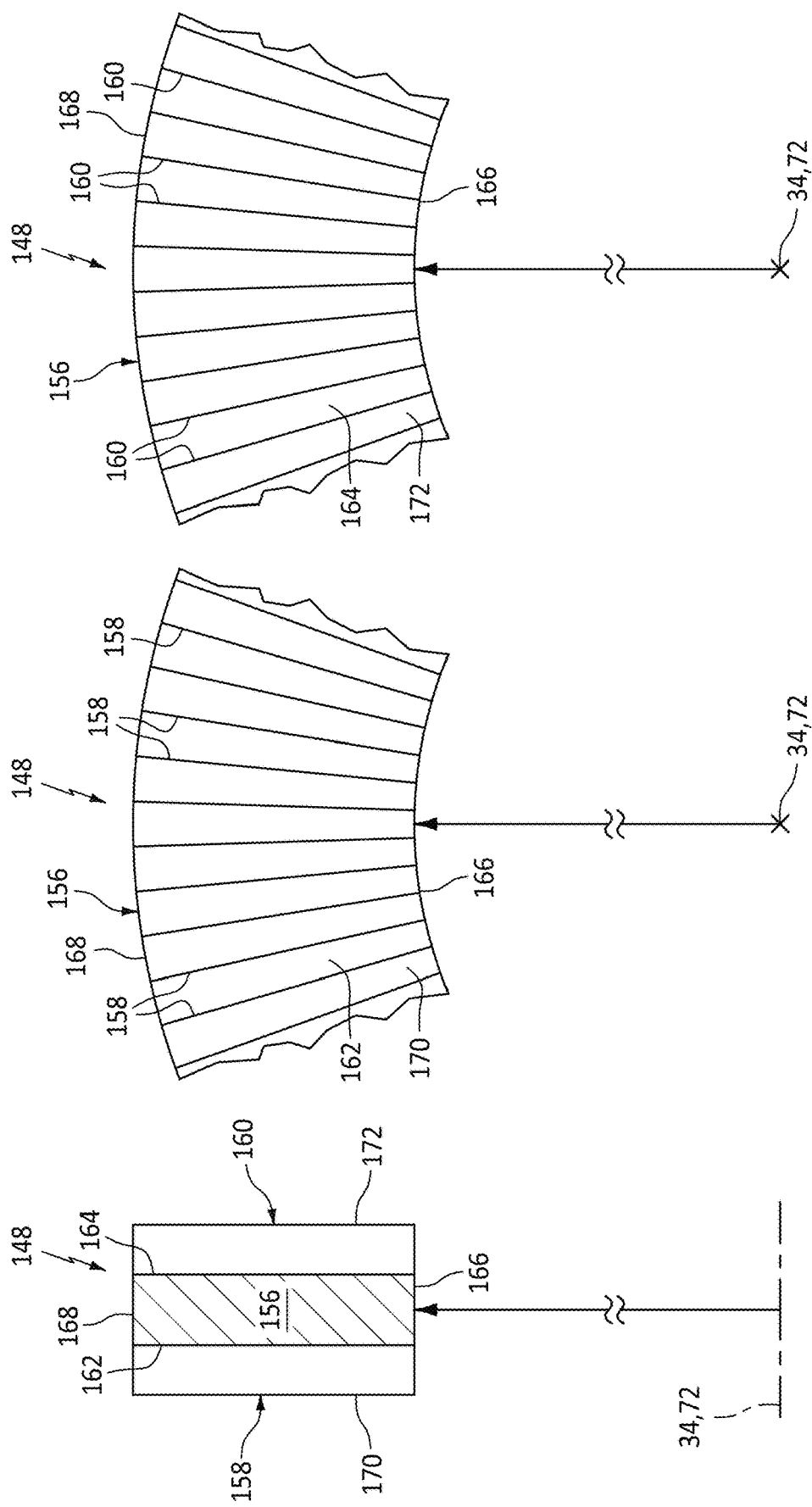

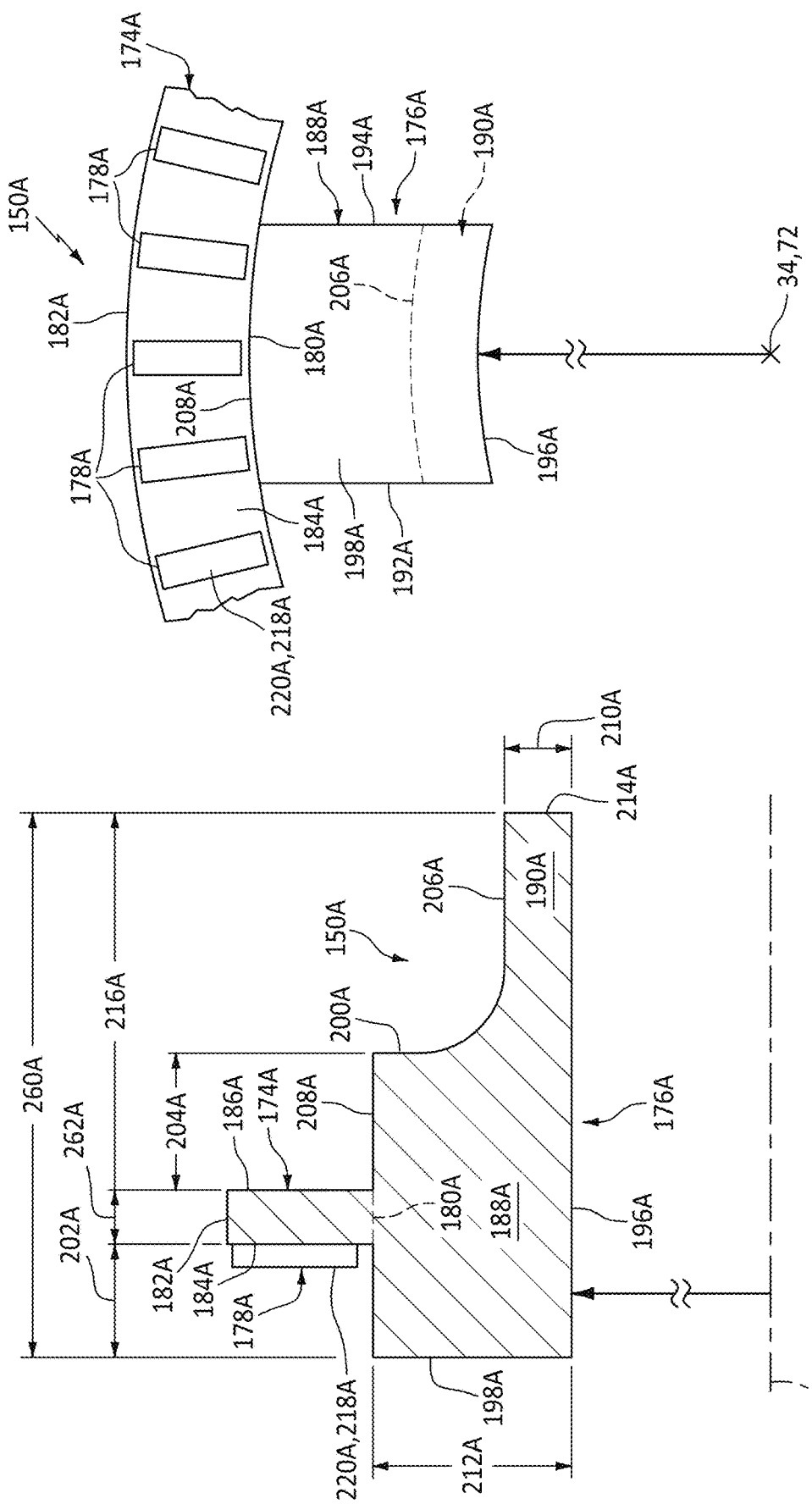

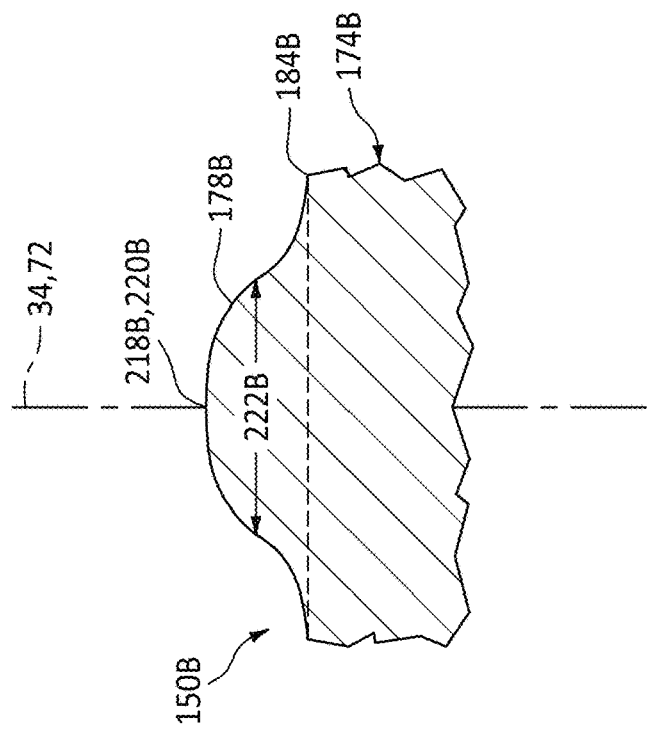
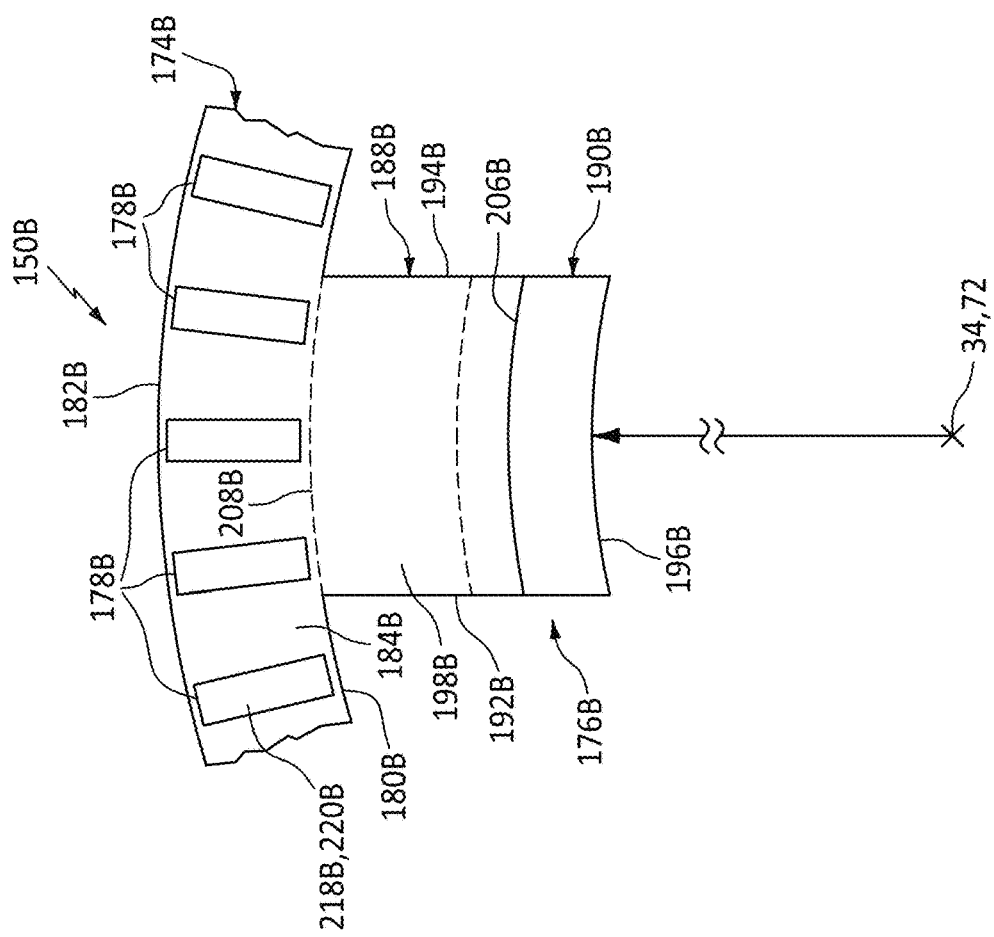

IN SITU BALANCING MASS(ES) FOR AIRCRAFT POWERPLANT

TECHNICAL FIELD

This disclosure relates generally to an aircraft powerplant and, more particularly, to systems and methods for rotationally balancing a rotating structure of the aircraft powerplant.

BACKGROUND INFORMATION

Various systems and methods are known in the art for rotationally balancing a rotating structure of an aircraft powerplant such as a gas turbine engine. While these known balancing systems and methods have various benefits, there is still room in the art for improvement.

SUMMARY

According to an aspect of the present disclosure, an apparatus is provided for an aircraft powerplant. This apparatus includes a rotating structure configured to rotate about an axis. The rotating structure includes a bladed rotor, a first component, a second component, a first balancing mass, a second balancing mass and a spring element. The first balancing mass and the second balancing mass are configured to rotationally balance the rotating structure about the axis. The first component include a plurality of first component teeth. The second component includes a plurality of second component teeth. The first balancing mass includes a first mass ring and a plurality of first mass teeth. The first mass ring extends circumferentially about the axis. The first mass teeth are arranged circumferentially about the axis and project axially out from the first mass ring. The first mass teeth are meshed with the first component teeth. The second balancing mass includes a second mass ring and a plurality of second mass teeth. The second mass ring extends circumferentially about the axis. The second mass teeth are arranged circumferentially about the axis and project axially out from the second mass ring. The second mass teeth are meshed with the second component teeth. The spring element is located axially between and engaged with the first balancing mass and the second balancing mass.

According to another aspect of the present disclosure, another apparatus is provided for an aircraft powerplant. This apparatus includes a rotating structure configured to rotate about an axis. The rotating structure includes a first component, a second component, a first balancing mass and a spring element. The first balancing mass is configured to rotationally balance the rotating structure about the axis. The first component includes a plurality of first component teeth. The first balancing mass includes a first mass ring, a first mass weight and a plurality of first mass teeth. The first mass ring extends circumferentially about the axis. The first mass weight is connected to and located radially inboard of the first mass ring. An axial thickness of the first mass weight is larger than an axial thickness of the first mass ring. The first mass teeth are arranged circumferentially about the axis and project axially out from the first mass ring. The first mass teeth are meshed with the first component teeth. The spring element is configured to axially bias the first mass ring towards the first component and away from the second component.

According to still another aspect of the present disclosure, another apparatus is provided for an aircraft powerplant. This apparatus includes a nut, a spacer, a first balancing mass, a spring element and a retainer. The nut includes a shoulder and a bore. The bore extends axially along an axis through the nut. The spacer is disposed in the bore and includes a plurality of spacer teeth. The first balancing mass is disposed in the bore and includes a first mass ring and a plurality of first mass teeth. The first mass ring extends circumferentially about the axis. The first mass teeth are arranged circumferentially about the axis and project axially out from the first mass ring. The first mass teeth are meshed with the spacer teeth. The spring element is disposed in the bore. The spring element is configured to axially bias the first mass ring against the spacer. The retainer is disposed in the bore and mounted to the nut. The spacer, the first balancing mass and the spring element are axially retained within the bore between the shoulder and the retainer.

The rotating structure may also include a bore. The first balancing mass, the second balancing mass and the spring element may be disposed in the bore and axially retained between the first component and the second component.

The second component may include an annular retainer disposed in the bore.

During a first condition when the spring element has a first axial thickness, the first balancing mass may be rotationally repositionable about the axis relative to the first component and/or the second balancing mass may be rotationally repositionable about the axis relative to the second component. During a second condition when the spring element has a second axial thickness that is greater than the first axial thickness, the first mass teeth may be meshed with the first component teeth to rotationally fix the first balancing mass to the first component and the second mass teeth may be meshed with the second component teeth to rotationally fix the second balancing mass to the second component.

The first mass ring may have a full-hoop body around the axis. In addition or alternatively, the second mass ring may have a full-hoop body around the axis.

Each of the first mass teeth may have a rounded first mass tooth tip. In addition or alternatively, each of the second mass teeth may have a rounded second mass tooth tip.

A first of the first mass teeth may have a first tooth width that decreases as the first of the first mass teeth may project axially out from the first mass ring to a tip of the first of the first mass teeth. In addition or alternatively, a first of the second mass teeth may have a second tooth width that decreases as the first of the second mass teeth projects axially out from the second mass ring to a tip of the first of the second mass teeth.

The first balancing mass may also include a first mass weight projecting radially inward from the first mass ring. In addition or alternatively, the second balancing mass further includes a second mass weight projecting radially inward from the second mass ring.

The first balancing mass may also include a first mass weight projecting axially away from the first mass ring in a direction away from the second mass ring. In addition or alternatively, the second balancing mass may also include a second mass weight projecting axially away from the second mass ring in a direction away from the first mass ring.

The first balancing mass may also include a first mass weight projecting axially away from the first mass ring in a direction towards the second mass ring. In addition or alternatively, the second balancing mass may also include a second mass weight projecting axially away from the second mass ring in a direction towards the first mass ring.

The first balancing mass may also include a first mass weight connected to the first mass ring. The second balancing mass may also include a second mass weight connected to the second mass ring. A center of gravity of the first mass weight may be axially aligned with a center of gravity of the second mass weight when the first mass teeth are meshed with the first component teeth and the second mass teeth are meshed with the second component teeth.

The first balancing mass may also include a first mass weight. The first mass weight may include a first weight base and a first weight tab. The first weight base may be connected to the first mass ring. The first weight tab may project axially out from the first weight base. In addition or alternatively, the second balancing mass may also include a second mass weight. The second mass weight may include a second weight base and a second weight tab. The second weight base may be connected to the second mass ring. The second weight tab may project axially out from the second weight base.

The first balancing mass may also include the first mass weight. The first weight tab may project axially out from the first weight base in a first axial direction. The second balancing mass may also include the second mass weight. The second weight tab may project axially out from the second weight base in the first axial direction.

The first balancing mass may also include a first mass weight connected to the first mass ring. An axial thickness of the first mass weight may be equal to an axial thickness of the first mass ring. In addition or alternatively, the second balancing mass may also include a second mass weight connected to the second mass ring. An axial thickness of the second mass weight may be equal to an axial thickness of the second mass ring.

The rotating structure may also include a nut with a bore. The first component, the second component, the first balancing mass and the second balancing mass may be disposed within the bore. The first component and the second component may each be rotationally fixed to the nut.

The first component may be configured as a nut with a bore. The second component, the first balancing mass and the second balancing mass may be disposed within the bore. The second component may be rotationally fixed to the nut.

The first component may be configured as a shaft with a bore. The second component, the first balancing mass and the second balancing mass may be disposed within the bore. The second component may be rotationally fixed to the shaft.

The apparatus may also include a compressor section, a combustor section, a turbine section and a flowpath extending through the compressor section, the combustor section and the turbine section, wherein the bladed rotor is disposed in the turbine section or the compressor section.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 5 is a partial sectional illustration of a mass spacer.

FIG. 6 is an end view illustration of a portion of the mass spacer at a set of first spacer teeth.

FIG. 7 is an end view illustration of a portion of the mass spacer at a set of second spacer teeth.

FIG. 8 is a partial sectional illustration of a first balancing mass.

FIG. 9 is an end view illustration of a portion of the first balancing mass at a set of first mass teeth.

FIG. 12 is an end view illustration of a portion of the second balancing mass at a set of second mass teeth.

FIG. 13 is a sectional illustration of a portion of the second balancing mass through an exemplary one of the second mass teeth.

DETAILED DESCRIPTION

Figure 1:
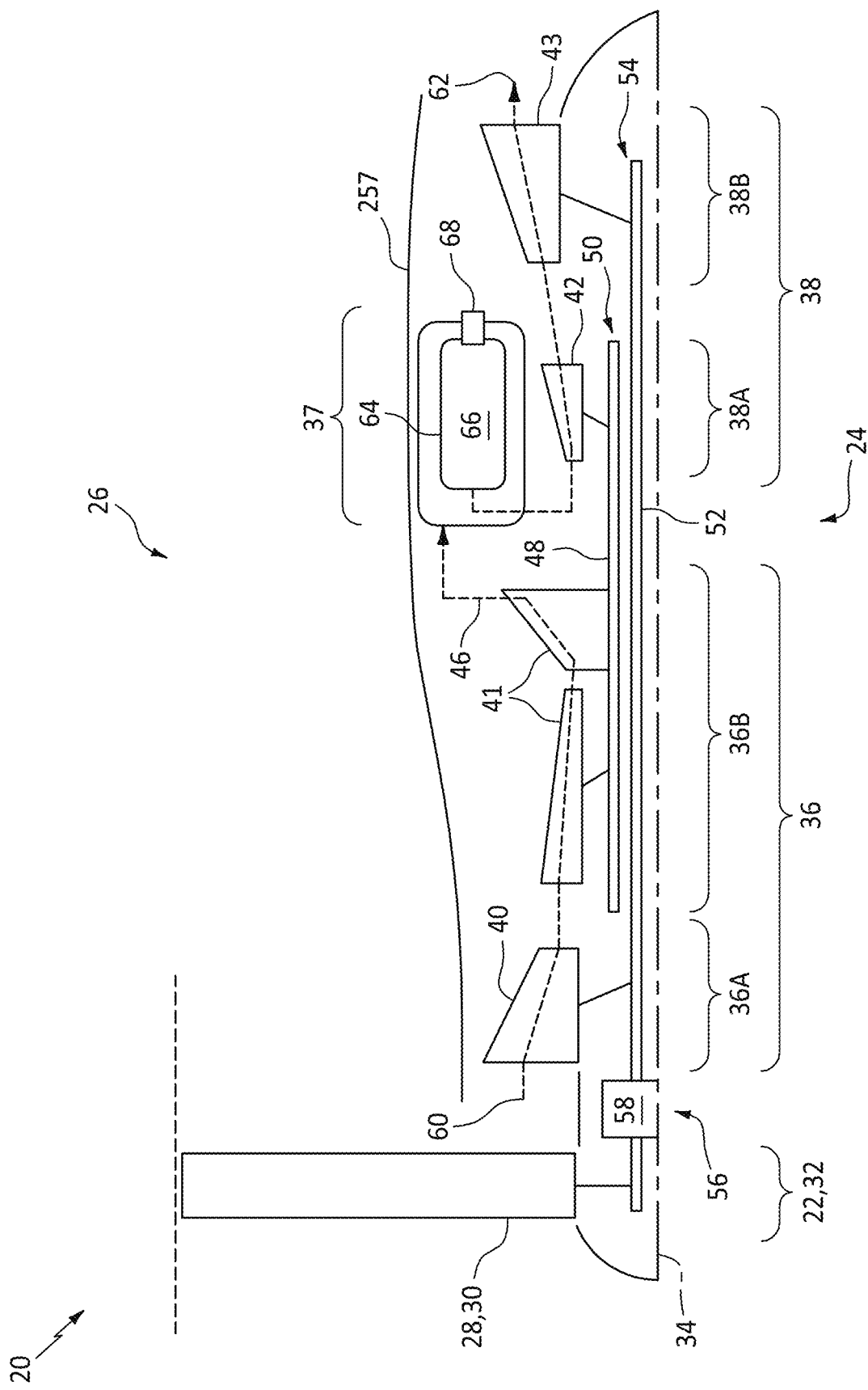
FIG. 1 is a partial schematic sectional illustration of an aircraft powerplant.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 may also or alternatively be configured as, or otherwise included as part of, an electrical power system for the aircraft. The aircraft powerplant 20 of FIG. 1 includes a mechanical load 22 and a core 24 of a gas turbine engine 26, where the engine core 24 (e.g., a gas generator) is configured to power operation of the mechanical load 22.

The mechanical load 22 may be configured as or otherwise include a rotor 28 mechanically driven by the engine core 24. This driven rotor 28 may be a bladed propulsor rotor 30 for the aircraft propulsion system. The propulsor rotor 30 may be a ducted propulsor rotor, an open propulsor rotor (e.g., an un-ducted propulsor rotor) or any other type of air moving rotor. For example, where the gas turbine engine 26 is a turbofan engine, the ducted propulsor rotor may be a fan rotor. Where the gas turbine engine 26 is a turboprop engine, the open propulsor rotor may be a propeller rotor. Where the gas turbine engine 26 is a turboshaft engine, the open propulsor rotor may be a rotorcraft rotor such as a helicopter main rotor or a helicopter tail rotor. Alternatively, the driven rotor 28 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary gas turbine engines. The gas turbine engine 26, for example, may alternatively be configured as a turbojet engine, a propfan engine, a pusher fan engine or any other type of gas turbine engine operable to power the operation of the mechanical load 22. However, for ease of description, the mechanical load 22 is described below as a propulsor section 32 of the gas turbine engine 26, and the driven rotor 28 is described below as the propulsor rotor 30 within the propulsor section 32.

The gas turbine engine 26 extends axially along an axis 34 from a forward, upstream end of the gas turbine engine 26 to an aft, downstream end of the gas turbine engine 26. Briefly, this powerplant axis 34 may be a centerline axis of the gas turbine engine 26 and/or its members. The powerplant axis 34 may also be a rotational axis of one or more members of the gas turbine engine 26. The gas turbine engine 26 of FIG. 1 includes the propulsor section 32, a compressor section 36, a combustor section 37 and a turbine section 38. The compressor section 36 of FIG. 1 includes a low pressure compressor (LPC) section 36A and a high pressure compressor (HPC) section 36B. The turbine section 38 of FIG. 1 includes a high pressure turbine (HPT) section 38A and a low pressure turbine (LPT) section 38B.

The LPC section 36A includes a low pressure compressor (LPC) rotor 40. The HPC section 36B includes a high pressure compressor (HPC) rotor 41. The HPT section 38A includes a high pressure turbine (HPT) rotor 42. The LPT section 38B includes a low pressure turbine (LPT) rotor 43. The LPC rotor 40, the HPC rotor 41, the HPT rotor 42 and the LPT rotor 43 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages longitudinally along an internal flowpath 46 (e.g., an annular core flowpath) of the gas turbine engine 26 and its engine core 24. Each of the rotor blades is connected to the respective rotor base. Each of the rotor blades projects radially (e.g., spanwise) out from the respective rotor base into the engine flowpath 46 and to a distal tip of the respective rotor blade.

The HPC rotor 41 is coupled to and rotatable with the HPT rotor 42. The HPC rotor 41 of FIG. 1, for example, is connected to the HPT rotor 42 by a high speed shaft 48. At least (or only) the HPC rotor 41, the HPT rotor 42 and the high speed shaft 48 collectively form a high speed rotating structure 50; e.g., a high speed spool of the gas turbine engine 26 and its engine core 24. This high speed rotating structure 50 may be rotatable about the powerplant axis 34.

The LPC rotor 40 is coupled to and rotatable with the LPT rotor 43. The LPC rotor 40 of FIG. 1, for example, is connected to the LPT rotor 43 by a low speed shaft 52. At least (or only) the LPC rotor 40, the LPT rotor 43 and the low speed shaft 52 collectively form a low speed rotating structure 54; e.g., a low speed spool of the gas turbine engine 26 and its engine core 24. This low speed rotating structure 54 is further coupled to the propulsor rotor 30—the driven rotor 28-through a drivetrain 56. This drivetrain 56 may be configured as a geared drivetrain, where a geartrain 58 (e.g., a transmission, a speed change device, an epicyclic geartrain, etc.) is disposed between and operatively couples the propulsor rotor 30 to the low speed rotating structure 54 and its LPT rotor 43. With this arrangement, the propulsor rotor 30 may rotate at a different (e.g., slower) rotational speed than the low speed rotating structure 54 and its LPT rotor 43. However, the drivetrain 56 may alternatively be configured as a direct-drive drivetrain, where the geartrain 58 is omitted. With such an arrangement, the propulsor rotor 30 rotates at a common (the same) rotational speed as the low speed rotating structure 54 and its LPT rotor 43. This low speed rotating structure 54 and/or the propulsor rotor 30 may be rotatable about the powerplant axis 34. Alternatively, the propulsor rotor 30 may be offset from the engine core 24 such that the propulsor rotor 30 rotates about an axis which is (e.g., laterally and/or axially) offset from the powerplant axis 34.

The engine flowpath 46 extends longitudinally within the gas turbine engine 26 and its engine core 24 from an airflow inlet 60 into the engine flowpath 46 to a combustion products exhaust 62 from the engine flowpath 46. The engine flowpath 46 of FIG. 1, for example, extends sequentially longitudinally through the LPC section 36A, the HPC section 36B, the combustor section 37, the HPT section 38A and the LPT section 38B, from the flowpath inlet 60 to the flowpath exhaust 62. With this arrangement, the engine flowpath 46 extends sequentially longitudinally across the LPC rotor 40, the HPC rotor 41, a (e.g., annular) combustor 64 within the combustor section 37, the HPT rotor 42 and the LPT rotor 43 between the flowpath inlet 60 and the flowpath exhaust 62.

During operation of the aircraft powerplant 20, ambient air may be directed across the propulsor rotor 30 (e.g., the fan rotor, the propeller rotor, etc.) and into the engine core 24 through the flowpath inlet 60. This air entering the engine flowpath 46 may be referred to as "core air". The core air is compressed by the LPC rotor 40 and the HPC rotor 41 and directed into a (e.g., annular) combustion chamber 66 within the combustor 64. Fuel is introduced into the engine flowpath 46 by one or more fuel injectors 68. This fuel is mixed with the compressed core air to provide a fuel-air mixture. The fuel-air mixture is ignited and combustion products thereof flow through and sequentially drive rotation of the HPT rotor 42 and the LPT rotor 43. The rotation of the HPT rotor 42 and the LPT rotor 43 respectively drive rotation of the LPC rotor 40 and the HPC rotor 41 and, thus, the compression of the air received from the flowpath inlet 60. The rotation of the LPT rotor 43 drives rotation of the propulsor rotor 30—the driven rotor 28. The rotation of the propulsor rotor 30 propels some of the air flow thereacross (e.g., the air not entering the engine core 24) outside of the engine core 24 to provide engine thrust. Of course, where the driven rotor 28 is alternatively configured as the generator rotor, the rotation of this generator rotor may facilitate generation of electricity.

While the aircraft powerplant 20 and its gas turbine engine 26 are described above with a particular two rotating structure arrangement, the present disclosure is not limited thereto. For example, the LPC rotor 40 may be omitted to configure the LPT rotor 43 as a power turbine (PT) rotor. In another example, the aircraft powerplant 20 and its gas turbine engine 26 may also include another rotating structure; e.g., an intermediate speed spool of the engine core 24. In still another example, the high speed rotating structure 50 may be omitted to provide the gas turbine engine 26 with a single rotating structure arrangement.

Figure 2:
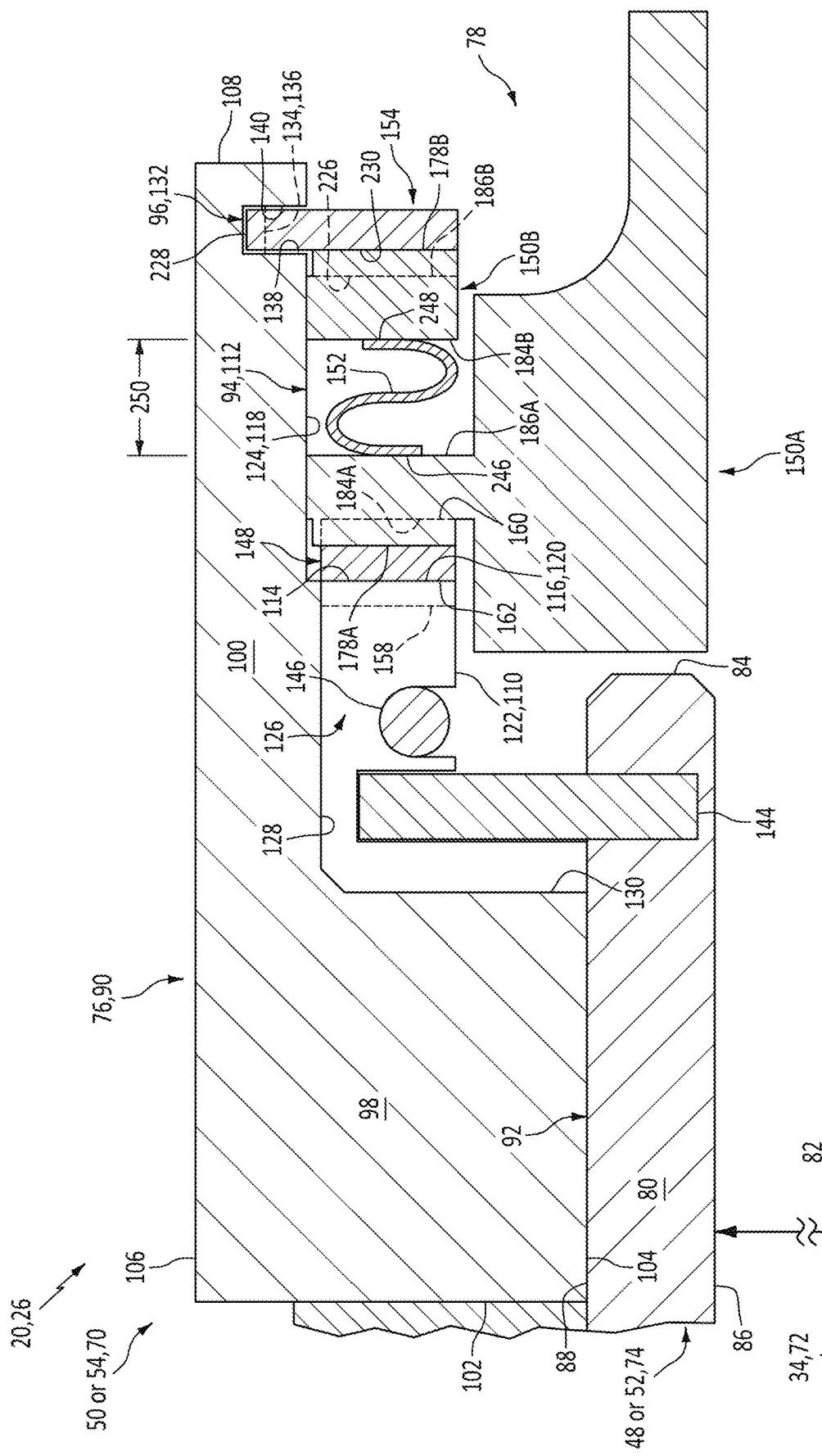
FIG. 2 is a partial sectional illustration of a powerplant rotating structure.

FIG. 2 illustrates a portion of a powerplant rotating structure 70 along an axis 72 such as the powerplant axis 34 (or another rotational axis). This powerplant rotating structure 70 may be configured as the high speed rotating structure 50, the low speed rotating structure 54 or another rotating structure within the aircraft powerplant 20 and its gas turbine engine 26. The powerplant rotating structure 70 is rotatable about the structure axis 72. The powerplant rotating structure 70 of FIG. 2 includes a powerplant shaft 74 (e.g., the high speed shaft 48, the low speed shaft 52, etc.), a powerplant nut 76 (e.g., a stack nut) and a rotating structure balancing device 78. The powerplant rotating structure 70, of course, may also include one or more additional powerplant components other than those shown in FIG. 2. For example, where the powerplant rotating structure 70 is configured as one of the rotating structures 50, 54, the powerplant rotating structure 70 also includes one or more engine rotors (e.g., 40 and 43, 41 and 42 as shown in FIG. 1).

The powerplant shaft 74 includes a shaft sidewall 80 and an internal shaft bore 82. The powerplant shaft 74 and its shaft sidewall 80 extend axially along the structure axis 72 to an axial distal end 84 of the powerplant shaft 74. The powerplant shaft 74 and its shaft sidewall 80 extend radially from a radial inner side 86 of the powerplant shaft 74 to a radial outer side 88 of the powerplant shaft 74. The powerplant shaft 74 and its shaft sidewall 80 extend circumferentially around the structure axis 72 providing the powerplant shaft 74 and its shaft sidewall 80 with a full-hoop (e.g., tubular) geometry. With this arrangement, the shaft sidewall 80 forms a radial outer peripheral boundary of the shaft bore 82 at the shaft inner side 86.

The powerplant nut 76 includes a nut body 90, an internal nut bore 92, a mass receptacle 94 and a retainer receptacle 96. The nut body 90 includes a nut base 98 and a nut flange 100 connected to (e.g., formed integral with or otherwise attached to) the nut base 98. The nut base 98 is disposed at and forms an axial first end 102 of the powerplant nut 76. The nut base 98 extends radially from a radial inner side 104 of the powerplant nut 76 to a radial outer side 106 of the powerplant nut 76. The nut flange 100 projects axially along the structure axis 72 out from the nut base 98 to an axial second end 108 of the powerplant nut 76. The nut flange 100 extends radially from a radial inner side 110 of the nut flange 100 to the nut outer side 106. The nut body 90 and at least a portion of each of its members 98 and 100 extend circumferentially around the structure axis 72 providing the powerplant nut 76 and its nut body 90 with a full-hoop (e.g., tubular) geometry. With this arrangement, the nut body 90 forms a radial outer peripheral boundary of the nut bore 92 at the nut inner side 104.

The mass receptacle 94 of FIG. 2 includes a mass receptacle aperture 112 (e.g., a recess, a notch, a channel, etc.) and a plurality of first nut teeth 114; e.g., splines. The mass receptacle aperture 112 projects partially axially into the powerplant nut 76 and its nut flange 100 to an axial distal end 116 of the mass receptacle 94, for example from the nut second end 108. The mass receptacle aperture 112 projects partially radially into the powerplant nut 76 and its nut flange 100 in a radial outward direction (away from the structure axis 72) from the flange inner side 110 to a radial outer side 118 of the mass receptacle 94. The receptacle end 116 of FIG. 2 is formed by an annular castellated shoulder 120 of the powerplant nut 76 and its nut flange 100. This nut shoulder 120 extends radially between and is contiguous with a castellated surface 122 of the powerplant nut 76 at the flange inner side 110 and a cylindrical surface 124 of the powerplant nut 76 at the receptacle outer side 118. The nut shoulder 120 of FIG. 2 is configured with the first nut teeth 114. The mass receptacle aperture 112 extends circumferentially around the structure axis 72 providing the mass receptacle 94 with a full-hoop (e.g., annular) geometry.

Figure 3:
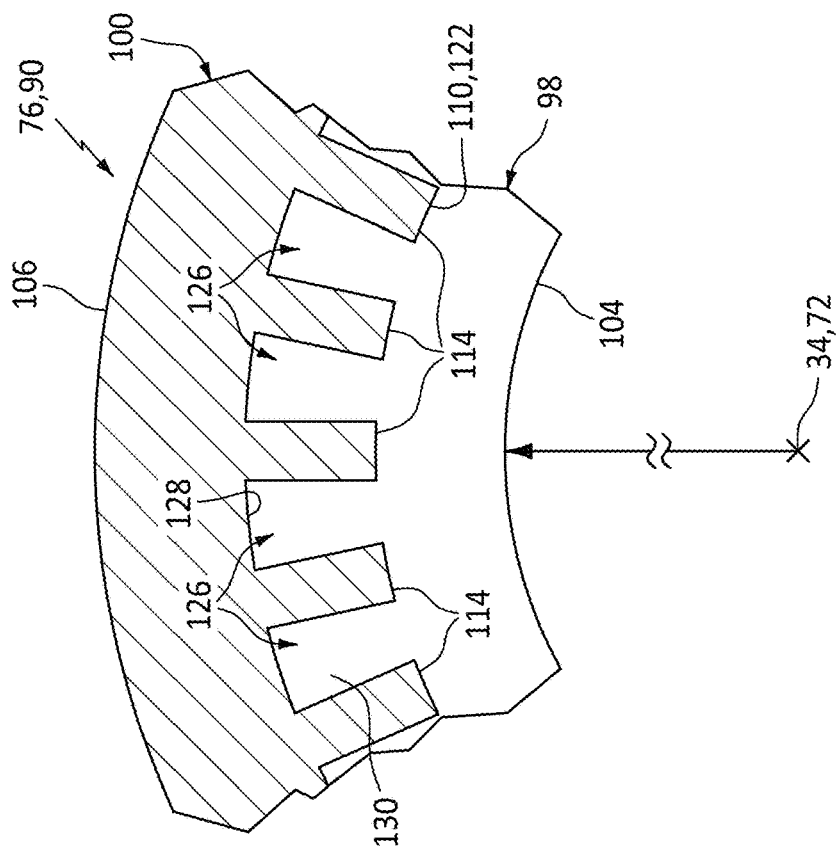
FIG. 3 is a cross-sectional illustration of a portion of a powerplant nut at a set of first nut teeth.

Referring to FIG. 3, the first nut teeth 114 are arranged and may be equispaced circumferentially about the structure axis 72 in an annular array; e.g., a circular array. These first nut teeth 114 are formed by a plurality of first nut slots 126 formed in the nut body 90 and its nut flange 100. The first nut slots 126 are arranged and may be equispaced circumferentially about the structure axis 72 in an annular array; e.g., a circular array. The first nut slots 126 are circumferentially interposed with the first nut teeth 114. Each first nut tooth 114 of FIG. 3, in particular, extends laterally (e.g., generally circumferentially) between a circumferentially neighboring (e.g., adjacent) pair of the first nut slots 126. Each first nut slot 126 of FIG. 3 extends laterally between a circumferentially neighboring pair of the first nut teeth 114. Each of the first nut slots 126 projects partially radially into the nut body 90 and its nut flange 100 in the radial outward direction from the flange inner side 110 to a radial end 128 of the respective first nut slot 126, which slot radial end 128 may be aligned with or (e.g., slightly) radially inboard of the receptacle outer side 118. Each first nut slot 126 projects partially axially into the nut body 90 along the structure axis 72 from the nut shoulder 120 (see FIG. 2) to an axial end 130 of the respective first nut slot 126, which slot axial end 130 may be formed by (and disposed in) the nut base 98.

The retainer receptacle 96 of FIG. 2 includes a retainer receptacle aperture 132 (e.g., a recess, a notch, a channel, etc.) and one or more second nut teeth 134; e.g., splines. The retainer receptacle aperture 132 projects partially radially into the powerplant nut 76 and its nut flange 100 from the receptacle outer side 118 to a castellated radial distal end 136 of the retainer receptacle aperture 132. The retainer receptacle aperture 132 extends axially within the powerplant nut 76 and its nut flange 100 between opposing axial sides 138 and 140 of the retainer receptacle 96. The retainer receptacle aperture 132 extends circumferentially around the structure axis 72 providing the retainer receptacle 96 with a full-hoop (e.g., annular) geometry.

Figure 4:
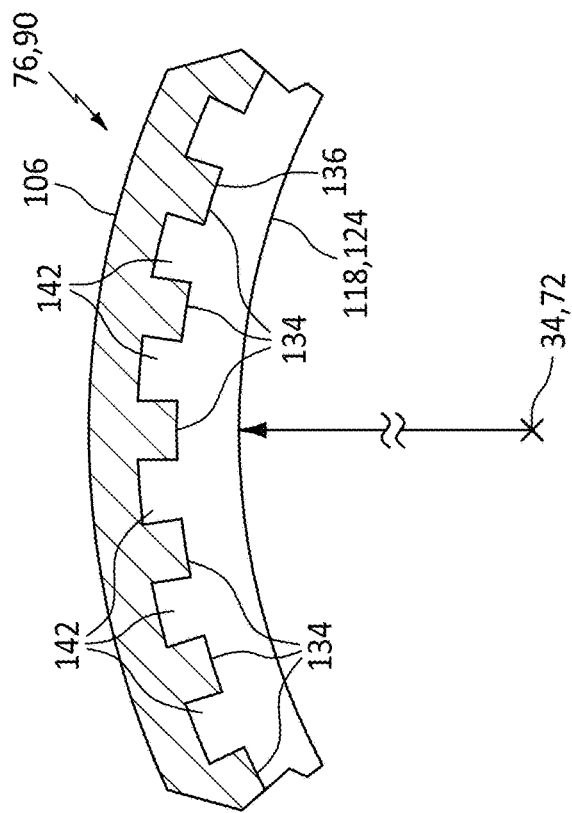
FIG. 4 is a cross-sectional illustration of a portion of the powerplant nut at a set of second nut teeth.

Referring to FIG. 4, the second nut teeth 134 are arranged and may be equispaced circumferentially about the structure axis 72 in an annular array; e.g., a circular array. These second nut teeth 134 are formed by a plurality of second nut slots 142 formed in the nut body 90 and its nut flange 100. The second nut slots 142 are arranged and may be equispaced circumferentially about the structure axis 72 in an annular array; e.g., a circular array. The second nut slots 142 are circumferentially interposed with the second nut teeth 134. Each second nut tooth 134 of FIG. 4, in particular, extends laterally (e.g., generally circumferentially) between a circumferentially neighboring (e.g., adjacent) pair of the second nut slots 142. Each second nut slot 142 of FIG. 4 extends laterally between a circumferentially neighboring pair of the second nut teeth 134. Each of the second nut slots 142 projects partially radially into the nut body 90 and its nut flange 100 in the radial outward direction from the distal end 136 of the retainer receptacle aperture 132 to a radial end of the respective second nut slot 142. Each second nut slot 142 projects axially within the nut body 90 along the structure axis 72 between opposing axial sides of the respective second nut slot 142.

The powerplant nut 76 of FIG. 2 is mounted onto the powerplant shaft 74 at (or about) the shaft distal end 84. More particularly, the nut base 98 is threaded onto a threaded end portion of the powerplant shaft 74. The end 130 of FIG. 2 spaced axially from and thereby axially recessed from the shaft distal end 84. The powerplant nut 76 may be rotationally and/or axially fixed to the powerplant shaft 74 by a mounting assembly; e.g., a keyed washer 144 and a nut retainer 146. Of course, various other techniques may be used for rotationally and/or axially securing the powerplant nut 76 to the powerplant shaft 74.

The rotating structure balancing device 78 is configured to rotationally balance the powerplant rotating structure 70 about the structure axis 72 while, for example, the powerplant rotating structure 70 remains partially or completely installed within the aircraft powerplant 20 and its gas turbine engine 26. The rotating structure balancing device 78 of FIG. 2 includes a mass spacer 148, a set of one or more balancing masses 150A and 150B (generally referred to as "150"), a spring element 152 (e.g., a wave spring) and a mass retainer 154; e.g., a retaining ring, a clip, a split ring, etc.

Referring to FIG. 5, the mass spacer 148 includes a spacer ring 156, a plurality of first spacer teeth 158 and a plurality of second spacer teeth 160. The spacer ring 156 extends axially along the structure axis 72 from an axial first side 162 of the spacer ring 156 to an axial second side 164 of the spacer ring 156. The spacer ring 156 extends radially from a radial inner end 166 of the mass spacer 148 to a radial outer end 168 of the mass spacer 148. The spacer ring 156 extends circumferentially around the structure axis 72 providing the mass spacer 148 and its spacer ring 156 with a full-hoop (e.g., annular) geometry.

Referring to FIG. 6, the first spacer teeth 158 are arranged and may be equispaced circumferentially about the structure axis 72 in an annular array; e.g., a circular array. Each of the first spacer teeth 158 is connected to (e.g., formed integral with or otherwise attached to) the spacer ring 156. Each of the first spacer teeth 158 may extend radially from (or about) the spacer inner end 166 to (or about) the spacer outer end 168. Referring to FIG. 5, each of the first spacer teeth 158 projects axially along the structure axis 72 out from the spacer ring first side 162 to an axial distal end of the respective first spacer tooth 158 at an axial first side 170 of the mass spacer 148. Each of the first spacer teeth 158 may laterally taper (e.g., be curved or beveled) as that first spacer tooth 158 projects axially out from (or about) the spacer ring first side 162 to (or about) the axial distal end of the respective first spacer tooth 158.

Referring to FIG. 7, the second spacer teeth 160 are arranged and may be equispaced circumferentially about the structure axis 72 in an annular array; e.g., a circular array. Each of the second spacer teeth 160 is connected to (e.g., formed integral with or otherwise attached to) the spacer ring 156. Each of the second spacer teeth 160 may extend radially from (or about) the spacer inner end 166 to (or about) the spacer outer end 168. Referring to FIG. 5, each of the second spacer teeth 160 projects axially along the structure axis 72 out from the spacer ring second side 164 to an axial distal end of the respective second spacer tooth 160 at an axial second side 172 of the mass spacer 148. Each of the second spacer teeth 160 may laterally taper (e.g., be curved or beveled) as that second spacer tooth 160 projects axially out from (or about) the spacer ring second side 164 to (or about) the axial distal end of the respective second spacer tooth 160.

Referring to FIG. 8, the first balancing mass 150A includes a first mass ring 174A, a first mass weight 176A and a plurality of first mass teeth 178A. The first mass ring 174A extends radially from a radial inner side 180A of the first mass ring 174A to a radial outer side 182A of the first balancing mass 150A. The first mass ring 174A extends axially along the structure axis 72 from an axial first side 184A of the first mass ring 174A to an axial second side 186A of the first mass ring 174A. The first mass ring 174A extends circumferentially around the structure axis 72 providing the first balancing mass 150A and its first mass ring 174A with a full-hoop (e.g., annular) geometry.

The first mass weight 176A includes a first weight base 188A and a first weight tab 190A. Referring to FIG. 9, the first mass weight 176A and its members 188A and 190A extend laterally between opposing lateral sides 192A and 194A of the first mass weight 176A. This first mass weight 176A is configured to provide the first balancing mass 150A with an eccentric center of mass about the structure axis 72.

Referring to FIG. 8, the first mass weight 176A and its first weight base 188A are connected to (e.g., formed integral with or otherwise attached to) the first mass ring 174A at the first mass ring inner side 180A. This first weight base 188A projects in a radial inward direction (towards the structure axis 72) from the first mass ring 174A to a radial inner side 196A of the first balancing mass 150A. The first weight base 188A extends axially along the structure axis 72 from an axial first end 198A of the first balancing mass 150A and its first mass weight 176A to an axial second end 200A of the first weight base 188A. The first balancing mass first end 198A of FIG. 8 is axially spaced from the first mass ring first side 184A by a first axial distance 202A. The first weight base second end 200A of FIG. 8 is axially spaced from the first mass ring second side 186A by a second axial distance 204A. This second axial distance 204A may be equal to or different (e.g., less) than the first axial distance 202A.

The first weight tab 190A is connected to (e.g., formed integral with or otherwise attached to) the first weight base 188A at the first weight base second end 200A. The first weight tab 190A is disposed at the first balancing mass inner side 196A. The first weight tab 190A extends radially from the first balancing mass inner side 196A to a radial outer side 206A of the first weight tab 190A, which first weight tab outer side 206A is spaced radially inboard of a radial outer side 208A of the first mass weight 176A and its first weight base 188A. With this arrangement, the first weight tab 190A has a radial height 210A that is less than a radial height 212A of the first mass weight 176A and its first weight base 188A. The first weight tab 190A projects axially along the structure axis 72 out from the first weight base 188A to an axial second end 214A of the first balancing mass 150A and its first mass weight 176A. The first balancing mass second end 214A of FIG. 8 is axially spaced from the first mass ring second side 186A by a third axial distance 216A. This third axial distance 216A may be greater than the first axial distance 202A such that the first mass ring 174A may be axially offset towards the first balancing mass first end 198A along the structure axis 72.

Figure 10:
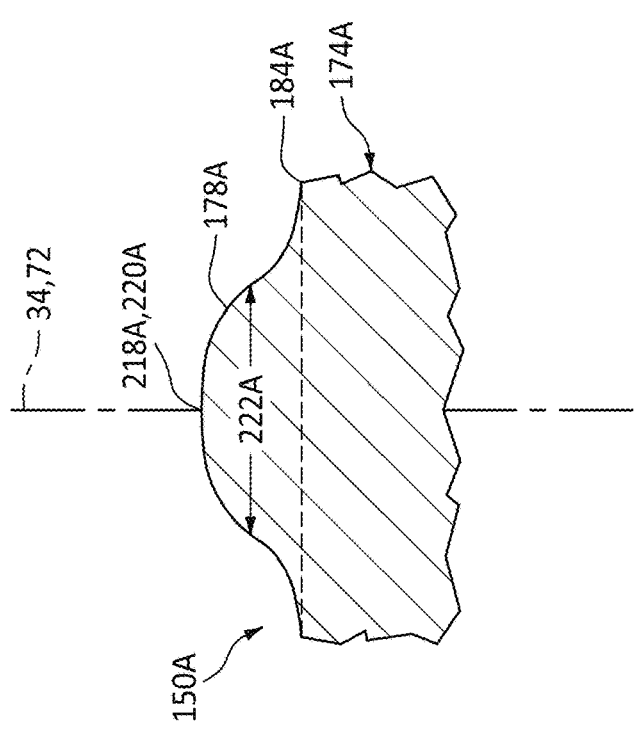
FIG. 10 is a sectional illustration of a portion of the first balancing mass through an exemplary one of the first mass teeth.

Referring to FIG. 9, the first mass teeth 178A are arranged and may be equispaced circumferentially about the structure axis 72 in an annular array; e.g., a circular array. Each of the first mass teeth 178A is connected to (e.g., formed integral with or otherwise attached to) the first mass ring 174A. Each of the first mass teeth 178A may extend radially from (or about) the first mass ring inner side 180A to (or about) the first balancing mass outer side 182A. Referring to FIG. 8, each of the first mass teeth 178A projects axially along the structure axis 72 out from the first mass ring first side 184A to an axial distal end 218A of the respective first mass tooth 178A. Referring to FIG. 10, each first mass tooth 178A may have a curved (e.g., rounded, arcuate, sinusoidal, splined, etc.) peripheral geometry with a rounded first mass tooth tip 220A at its distal end 218A when viewed, for example, in a reference plane tangent to a reference circle at the respective first mass tooth 178A, which reference circle is perpendicular to and circumscribes the structure axis 72. Here, a lateral width 222A of each first mass tooth 178A may (e.g., continuously) decrease as the respective first mass tooth 178A projects axially out from the first mass ring 174A to the respective first mass tooth tip 220A at its distal end 218A. The present disclosure, however, is not limited to such an exemplary tooth configuration. For example, in other embodiments, each first mass tooth 178A may have a polygonal peripheral geometry; e.g., a triangular peripheral geometry, a trapezoidal peripheral geometry, etc.

Figure 11:
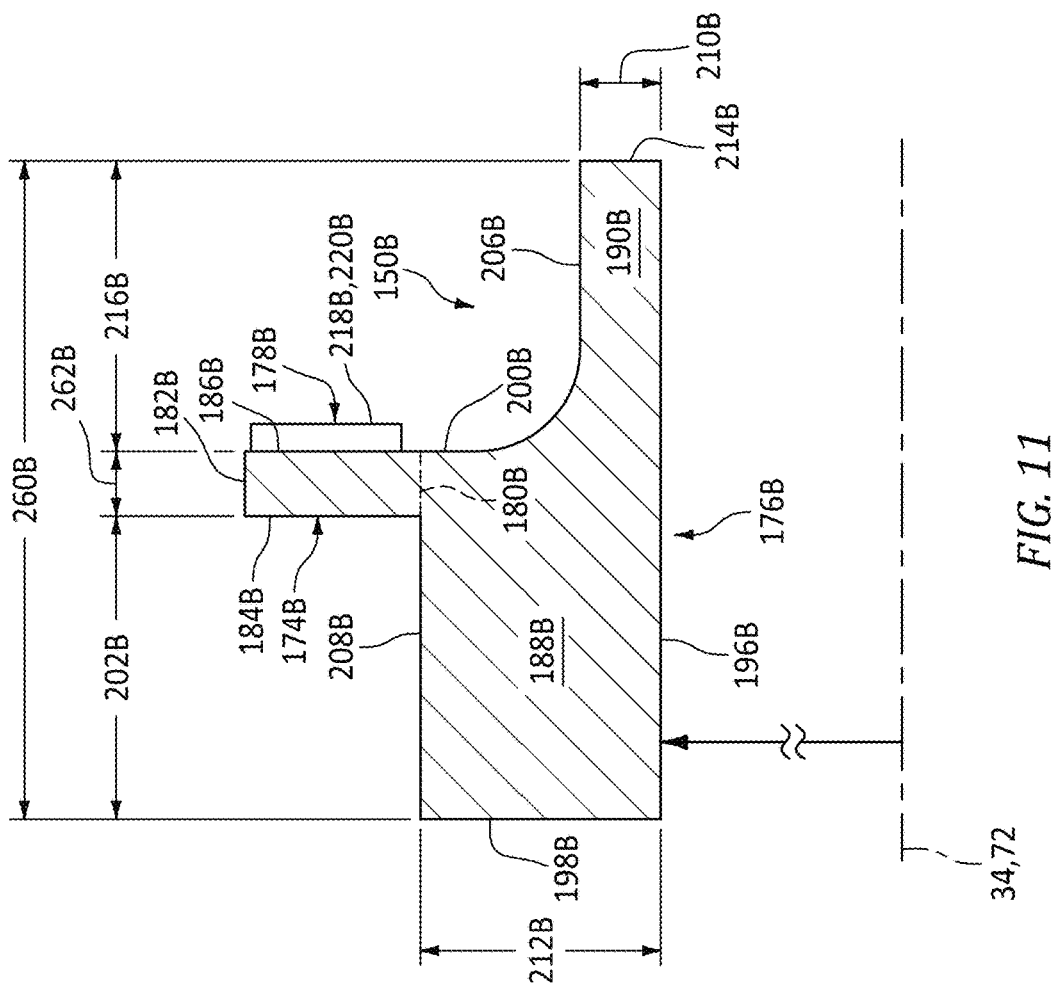
FIG. 11 is a partial sectional illustration of a second balancing mass.

Referring to FIG. 11, the second balancing mass 150B includes a second mass ring 174B, a second mass weight 176B and a plurality of second mass teeth 178B. The second mass ring 174B extends radially from a radial inner side 180B of the second mass ring 174B to a radial outer side 182B of the second balancing mass 150B. The second mass ring 174B extends axially along the structure axis 72 from an axial first side 184B of the second mass ring 174B to an axial second side 186B of the second mass ring 174B. The second mass ring 174B extends circumferentially around the structure axis 72 providing the second balancing mass 150B and its second mass ring 174B with a full-hoop (e.g., annular) geometry.

The second mass weight 176B includes a second weight base 188B and a second weight tab 190B. Referring to FIG. 12, the second mass weight 176B and its members 188B and 190B extend laterally between opposing lateral sides 192B and 194B of the second mass weight 176B. This second mass weight 176B is configured to provide the second balancing mass 150B with an eccentric center of mass about the structure axis 72.

Referring to FIG. 11, the second mass weight 176B and its second weight base 188B are connected to (e.g., formed integral with or otherwise attached to) the second mass ring 174B at the second mass ring inner side 180B. This second weight base 188B projects in the radial inward direction from the second mass ring 174B to a radial inner side 196B of the second balancing mass 150B. The second weight base 188B extends axially along the structure axis 72 from an axial first end 198B of the second balancing mass 150B and its second mass weight 176B to an axial second end 200B of the second weight base 188B. The second balancing mass first end 198B of FIG. 11 is axially spaced from the second mass ring first side 184B by a fourth axial distance 202B. This fourth axial distance 202B may be larger than the first axial distance 202A of FIG. 8. The second weight base second end 200B of FIG. 11 may (or may not) be axially aligned with the second mass ring second side 186B.

The second weight tab 190B is connected to (e.g., formed integral with or otherwise attached to) the second weight base 188B at the second weight base second end 200B. The second weight tab 190B is disposed at the second balancing mass inner side 196B. The second weight tab 190B extends radially from the second balancing mass inner side 196B to a radial outer side 206B of the second weight tab 190B, which second weight tab outer side 206B is spaced radially inboard of a radial outer side 208B of the second mass weight 176B and its second weight base 188B. With this arrangement, the second weight tab 190B has a radial height 210B that is less than a radial height 212B of the second mass weight 176B and its second weight base 188B. The second weight tab 190B projects axially along the structure axis 72 out from the second weight base 188B to an axial second end 214B of the second balancing mass 150B and its second mass weight 176B. The second balancing mass second end 214B of FIG. 11 is axially spaced from the second mass ring second side 186B by a fifth axial distance 216B. This fifth axial distance 216B may be less than the fourth axial distance 202B such that the second mass ring 174B may be axially offset towards the second balancing mass second end 214B along the structure axis 72. The fifth axial distance 216B may also be less than the third axial distance 216A of FIG. 8.

Referring to FIG. 12, the second mass teeth 178B are arranged and may be equispaced circumferentially about the structure axis 72 in an annular array; e.g., a circular array. Each of the second mass teeth 178B is connected to (e.g., formed integral with or otherwise attached to) the second mass ring 174B. Each of the second mass teeth 178B may extend radially from (or about) the second mass ring inner side 180B to (or about) the second balancing mass outer side 182B. Referring to FIG. 11, each of the second mass teeth 178B projects axially along the structure axis 72 out from the second mass ring second side 186B to an axial distal end 218B of the respective second mass tooth 178B. Referring to FIG. 13, each second mass tooth 178B may have a curved (e.g., rounded, arcuate, sinusoidal, splined, etc.) peripheral geometry with a rounded second mass tooth tip 220B at its distal end 218B when viewed, for example, in a reference plane tangent to a reference circle at the respective second mass tooth 178B, which reference circle is perpendicular to and circumscribes the structure axis 72. Here, a lateral width 222B of each second mass tooth 178B may (e.g., continuously) decrease as the respective second mass tooth 178B projects axially out from the second mass ring 174B to the respective second mass tooth tip 220B at its distal end 218B. The present disclosure, however, is not limited to such an exemplary tooth configuration. For example, in other embodiments, each second mass tooth 178B may have a polygonal peripheral geometry; e.g., a triangular peripheral geometry, a trapezoidal peripheral geometry, etc.

Figure 14:
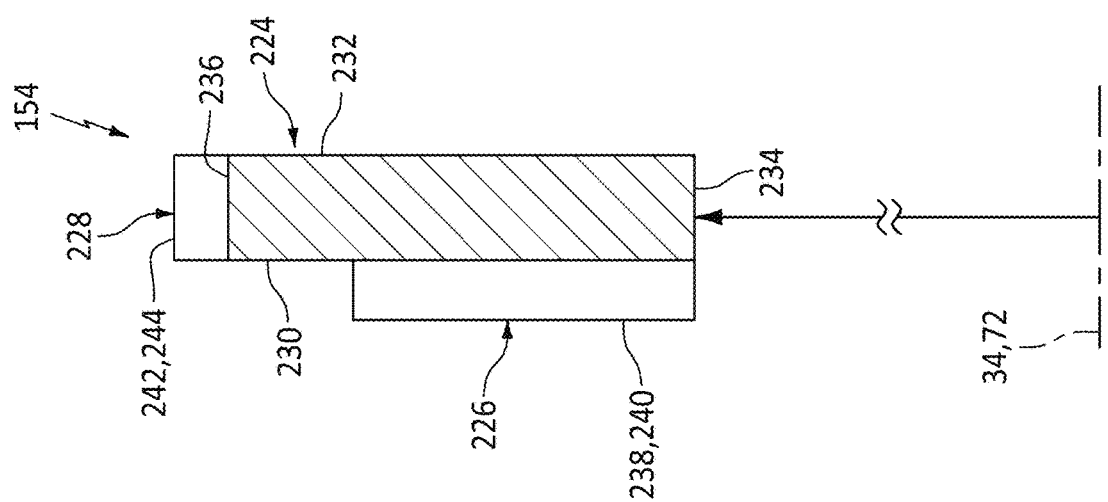
FIG. 14 is a partial sectional illustration of a mass retainer.

Referring to FIG. 14, the mass retainer 154 includes a retainer ring 224 and a plurality of first retainer teeth 226 and one or more second retainer teeth 228. The retainer ring 224 extends axially along the structure axis 72 from an axial first side 230 of the retainer ring 224 to an axial second side 232 of the mass retainer 154. The retainer ring 224 extends radially from a radial inner end 234 of the mass retainer 154 to a radial outer end 236 of the retainer ring 224. The retainer ring 224 extends circumferentially around the structure axis 72 providing the mass retainer 154 and its retainer ring 224 with a substantially full-hoop geometry; e.g., with a snap-ring geometry.

Figure 15:
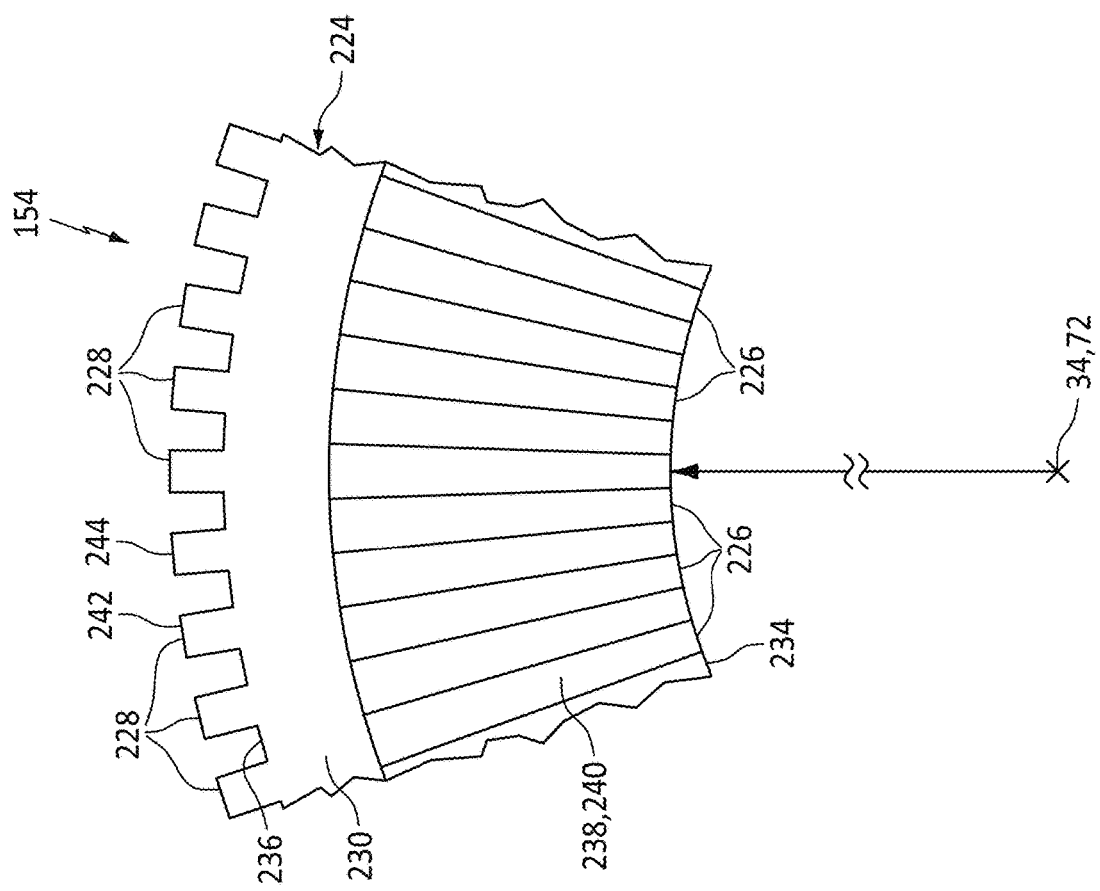
FIG. 15 is an end view illustration of a portion of the mass retainer.

Referring to FIG. 15, the first retainer teeth 226 are arranged and may be equispaced circumferentially about the structure axis 72 in an annular array; e.g., a circular array. Each of the first retainer teeth 226 is connected to (e.g., formed integral with or otherwise attached to) the retainer ring 224. Each of the first retainer teeth 226 may extend radially from (or about) the retainer inner end 234 towards the retainer ring outer end 236. Referring to FIG. 14, each of the first retainer teeth 226 projects axially along the structure axis 72 out from the retainer ring first side 230 to an axial distal end 238 of the respective first retainer tooth 226 at an axial first side 240 of the mass retainer 154.

Referring to FIG. 15, the second retainer teeth 228 are arranged and may be equispaced circumferentially about the structure axis 72 in an annular array; e.g., a circular array. Each of the second retainer teeth 228 is connected to (e.g., formed integral with or otherwise attached to) the retainer ring 224. Each of the second retainer teeth 228 may project radially out from the retainer ring outer end 236 to a radial outer distal end 242 of the respective second retainer tooth 228 at a radial outer end 244 of the mass retainer 154. Referring to FIG. 14, each of the second retainer teeth 228 extends axially along the retainer ring 224 from (or about) the retainer ring first side 230 to (or about) the retainer second side 232.

Referring to FIG. 2, the rotating structure balancing device 78 and its members 148, 150A, 152, 150B and 154 are disposed within the nut bore 92 and mounted to the powerplant nut 76. The balancing device members 148, 150A, 152 and 150B of FIG. 2 are arranged sequentially along the structure axis 72 between the nut shoulder 120 and the mass retainer 154. The balancing device members 148, 150A, 152 and 150B are thereby axially retained within the nut bore 92 when the mass retainer 154 is mounted to the powerplant nut 76 as described below in further detail.

The mass spacer 148 of FIG. 2 engages the powerplant nut 76 through an axial meshed interface. At this axial meshed interface, the spacer ring first side 162 may axially abut against and may be axially biased (e.g., via the spring element 152) against the nut shoulder 120. The first spacer teeth 158 are meshed with the first nut teeth 114. Each first spacer tooth 158, for example, may project axially into a respective one of the first nut slots 126 (see FIG. 3). Similarly, each first nut tooth 114 may project axially into a gap between a respective circumferentially neighboring pair of the first spacer teeth 158. The mass spacer 148 is thereby rotationally fixed to the powerplant nut 76. Here, the first spacer teeth 158 and the first nut teeth 114 are provided with relatively tight tolerances such that there is little to no play between the teeth 114 and 158 at the respective axial meshed interface.

The first balancing mass 150A of FIG. 2 engages the mass spacer 148 through an axial meshed interface. At this axial meshed interface, the first mass teeth 178A are meshed with the second spacer teeth 160. Each first mass tooth 178A, for example, may project axially into a gap between a respective circumferentially neighboring pair of the second spacer teeth 160. Similarly, each second spacer tooth 160 may project axially into a gap between a respective circumferentially neighboring pair of the first mass teeth 178A. The first balancing mass 150A is thereby rotationally anchored to the mass spacer 148 and, thus, the powerplant nut 76 during a first mode of operation; e.g., an anchored mode. The first balancing mass 150A is thereby operable to rotate with the powerplant rotating structure 70 and maintain powerplant rotating structure balance (in conjunction with the second balancing mass 150B), once set. Here, the first mass teeth 178A and the second spacer teeth 160 are provided with relatively tight tolerances such that there is little to no play between the teeth 160 and 178A at the respective axial meshed interface.

The spring element 152 is disposed axially between and engaged with the first balancing mass 150A and the second balancing mass 150B. A first axial side 246 of the spring element 152 of FIG. 2, for example, is abutted axially against the first mass ring second side 186A. A second axial side 248 of the spring element 152 is abutted axially against the second mass ring first side 184B. During the first operating mode of FIG. 2, the spring element 152 may be axially compressed between the first balancing mass 150A and the second balancing mass 150B to a first axial thickness 250 measured axially between the opposing axial sides 246 and 248 of the spring element 152; e.g., an axial distance between the first mass ring 174A and the second mass ring 174B.

The mass retainer 154 of FIG. 2 engages the powerplant nut 76 through a radial meshed interface. At this radial meshed interface, the second retainer teeth 228 are meshed with the second nut teeth 134. Each second retainer tooth 228, for example, may project radially into a respective one of the second nut slots 142 (see FIG. 4). Similarly, each second nut tooth 134 may project axially into a gap between a respective circumferentially neighboring pair of the second retainer teeth 228. The mass retainer 154 is thereby rotationally fixed to the powerplant nut 76. Alternatively, a single key or multiple keys (or other anti-rotation feature(s)) may be provided between the mass retainer 154 and the powerplant nut 76 (e.g., in place of the teeth 134 and the teeth 228) to rotationally fix the mass retainer 154 to the powerplant nut 76.

The second balancing mass 150B of FIG. 2 engages the mass retainer 154 through an axial meshed interface. At this axial meshed interface, the second mass teeth 178B are meshed with the first retainer teeth 226. Each second mass tooth 178B, for example, may project axially into a gap between a respective circumferentially neighboring pair of the first retainer teeth 226. Similarly, each first retainer tooth 226 may project axially into a gap between a respective circumferentially neighboring pair of the second mass teeth 178B. The second balancing mass 150B is thereby rotationally anchored to the mass retainer 154 and, thus, the powerplant nut 76 during the first operating mode. The second balancing mass 150B is thereby operable to rotate with the powerplant rotating structure 70 and maintain powerplant rotating structure balance (in conjunction with the first balancing mass 150A), once set. Here, the second mass teeth 178B and the first retainer teeth 226 are provided with relatively tight tolerances such that there is little to no play between the teeth 178B and 226 at the respective axial meshed interface.

Figure 16:
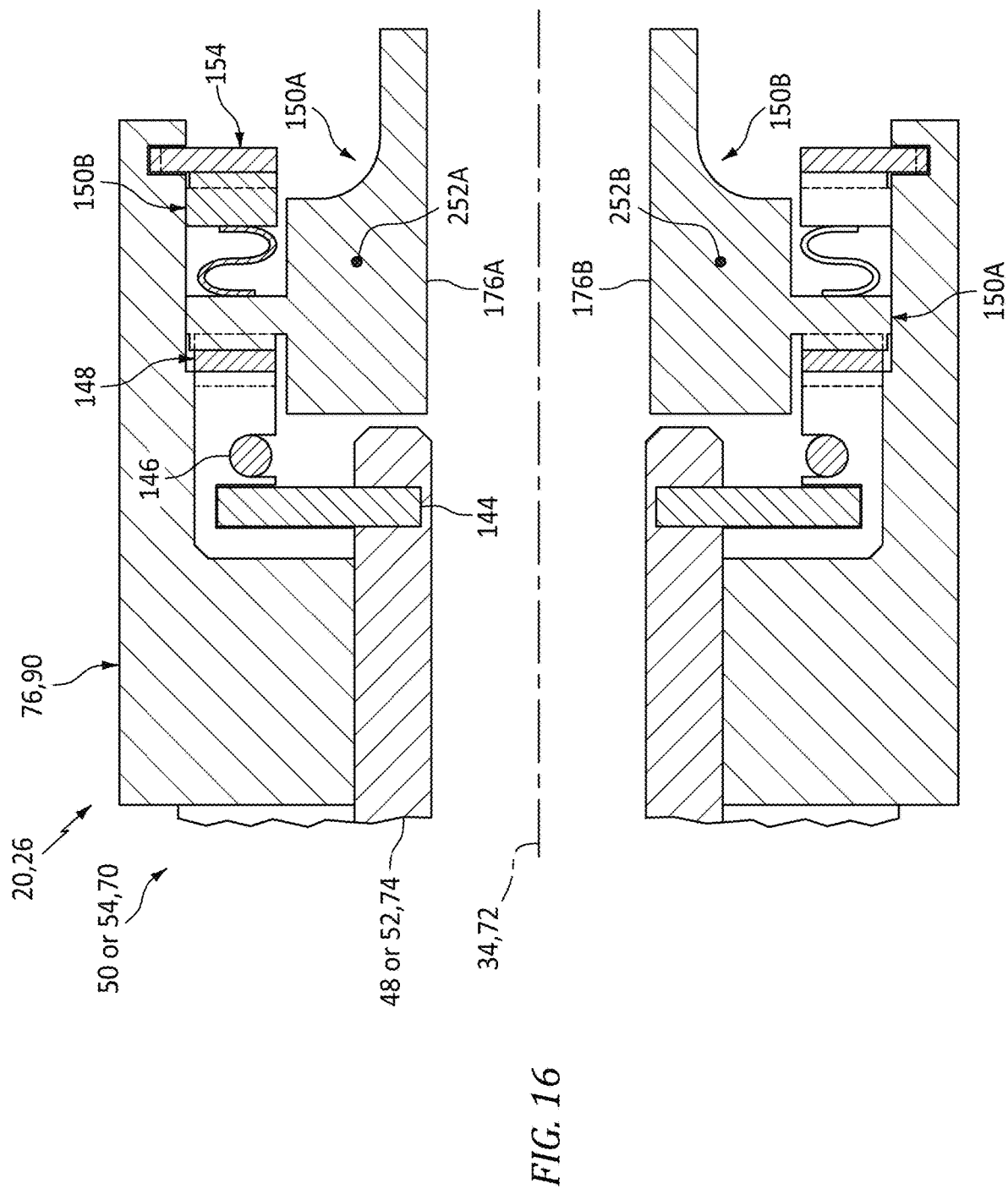
FIG. 16 is a partial sectional illustration of the powerplant rotating structure.

Referring to FIG. 16, during the first operating mode, a center of gravity 252A of the first mass weight 176A may be axially aligned with a center of gravity 252B of the second mass weight 176B. This first mass weight 176A and second mass weight 176B alignment may facilitate partial or complete cancellation of local forced and moments exerted by the balancing masses on the rest of the powerplant rotating structure 70.

Figure 17:
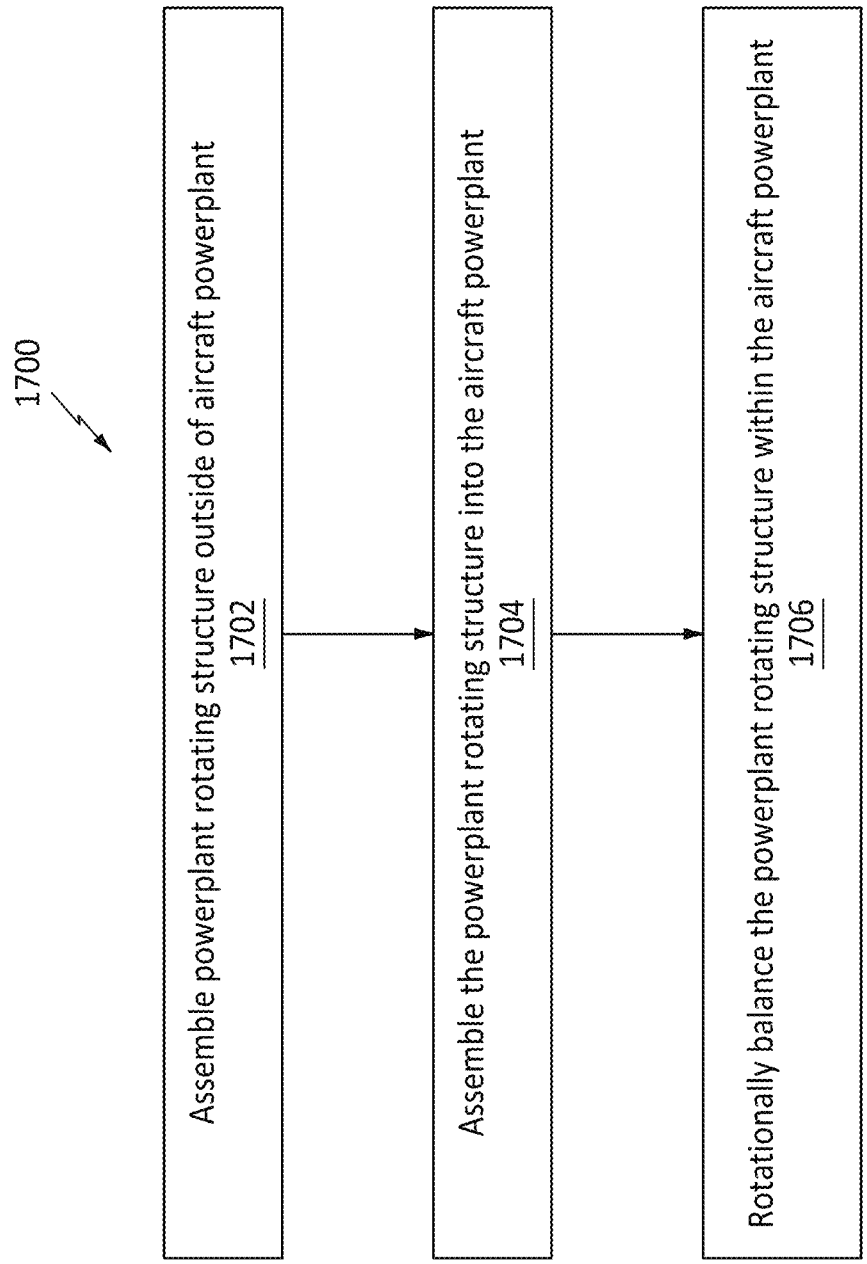
FIG. 17 is a flow diagram of a method for balancing a rotating structure of an aircraft powerplant.

FIG. 17 is a flow diagram of a method 1700 for (e.g., in situ) balancing a rotating structure of an aircraft powerplant. For ease of description, this balancing method 1700 is described below with respect to the powerplant rotating structure 70 shown in FIGS. 2-16. The present disclosure, however, is not limited to such an exemplary powerplant rotating structure 70 nor to use of the exemplary balancing device described herein.

In step 1702, the powerplant rotating structure 70 is assembled outside of the aircraft powerplant 20 and its gas turbine engine 26. During this assembly, the powerplant rotating structure 70 may be rotationally balanced on a balancing rig using various known balancing techniques.

In step 1704, the powerplant rotating structure 70 is assembled into the aircraft powerplant 20 and its gas turbine engine 26. The previously assembled and balanced powerplant rotating structure 70, for example, may be partially or completely disassembled and then reassembled into the aircraft powerplant 20 and its gas turbine engine 26. During this reassembly process, slight variations due to manufacturing tolerances, etc. may lead to a slight misbalance of the powerplant rotating structure 70. In addition or alternatively, the previous balancing process may not be capable of balancing at a full rotational speed of the powerplant rotating structure 70 and/or correct for interactions that occur once the powerplant rotating structure 70 is assembled in the aircraft powerplant 20 and its gas turbine engine 26. These may lead to slight imbalance and/or slight vibrations of the powerplant rotating structure 70 if left unmitigated.

Figure 18A:
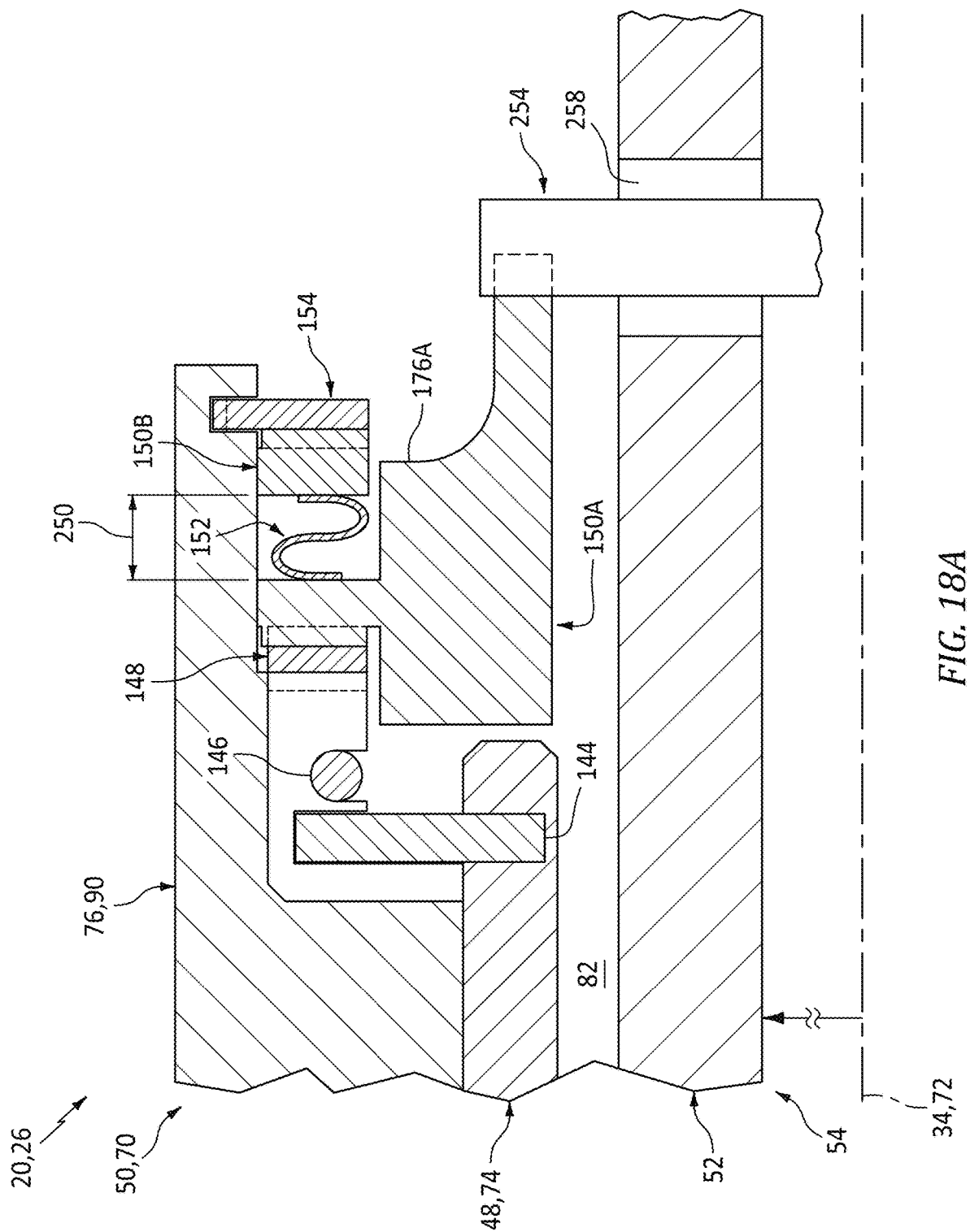
FIGS. 18A-C are illustrations of a balancing device during a balancing operation.
Figure 18B:
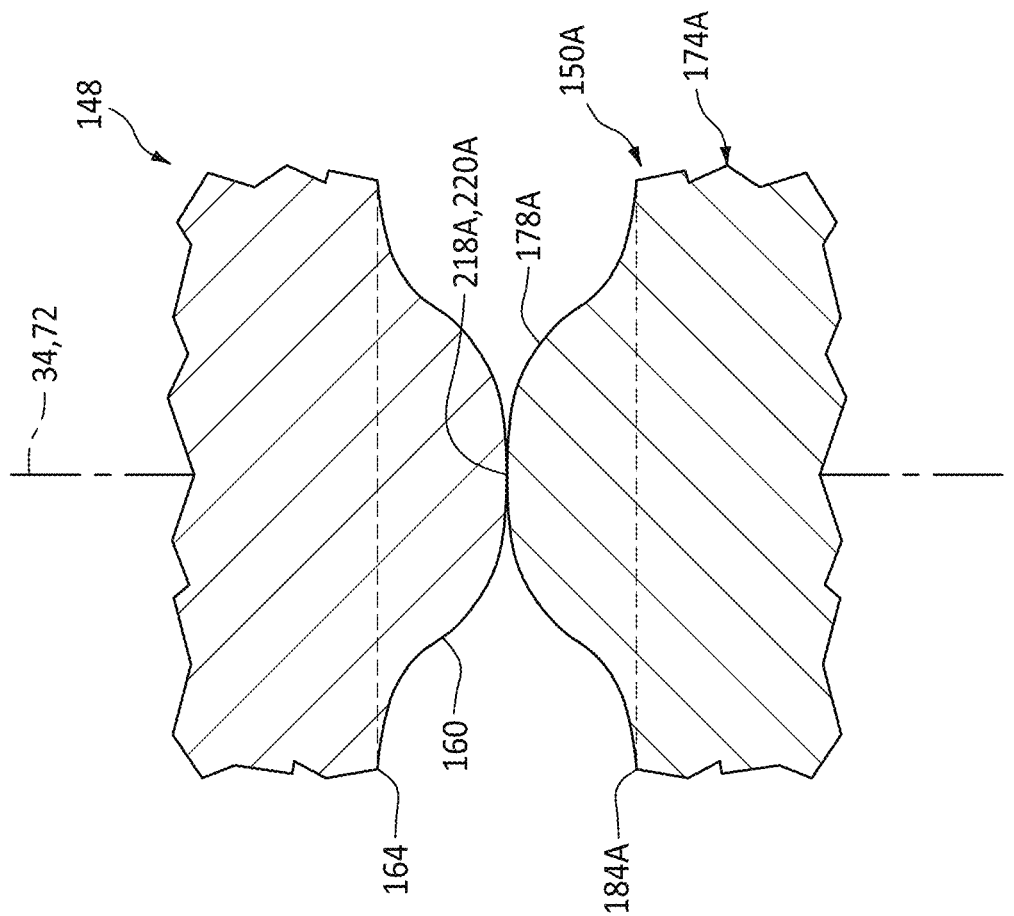
Figure 18C:
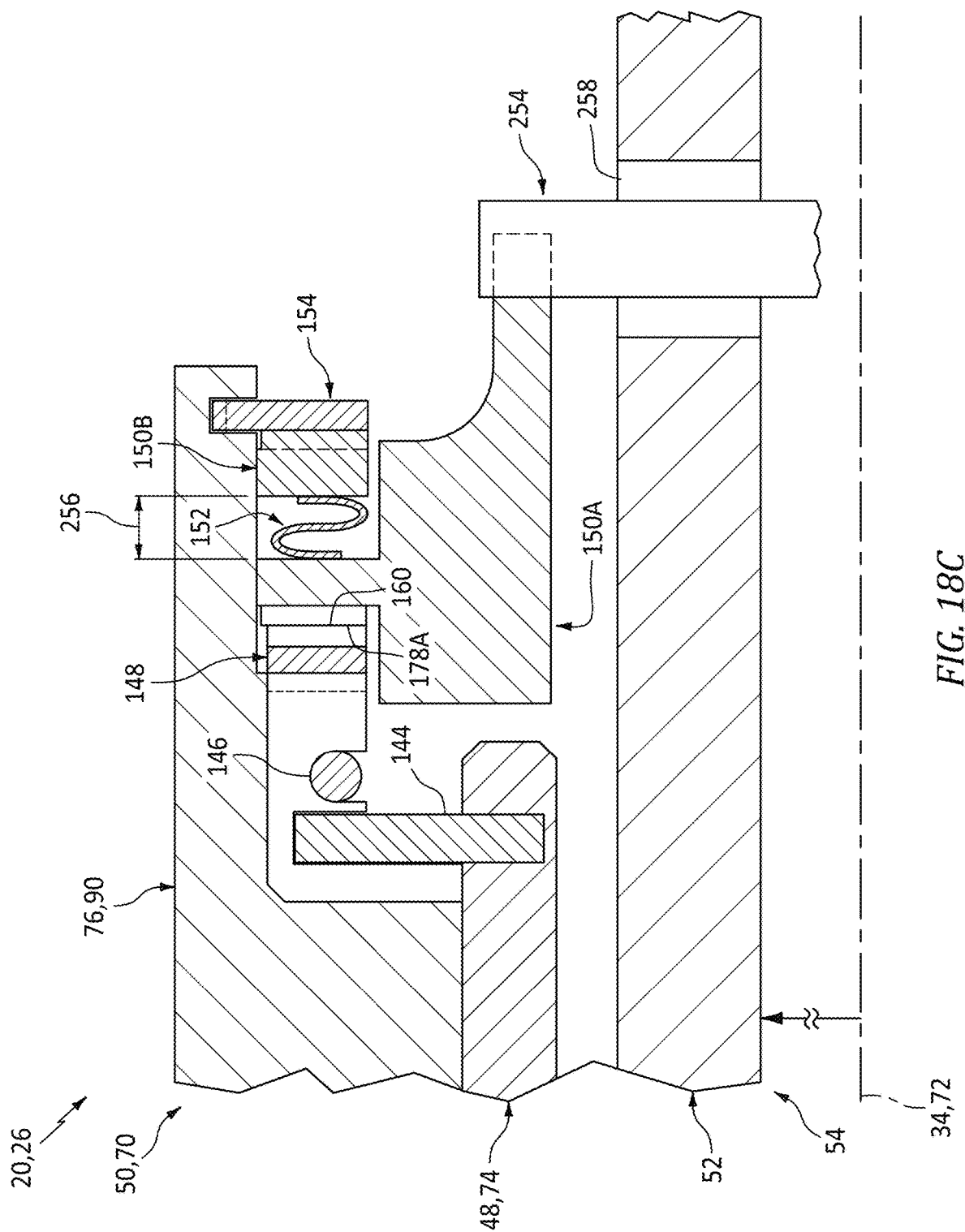

In step 1706, the powerplant rotating structure 70 is rotationally balanced while partially or completely assembled within the aircraft powerplant 20 and its gas turbine engine 26. For example, referring to FIG. 18A, a tool 254 may be inserted into the shaft bore 82 and mated with a respective one of the balancing masses; e.g., the first balancing mass 150A. The tool 254 in FIG. 18A, for example, may engage (e.g., grip, abut against, etc.) the first mass weight 176A. While engaging the first balancing mass 150A, the tool 254 may be maneuvered (e.g., turned around the structure axis 72) to rotate the respective balancing mass (e.g., 150A) about the structure axis 72. Referring to FIG. 18B, as a torque is applied to the first balancing mass 150A by the tool 254 (see FIG. 18A) during a second mode of operation (e.g., an adjustment mode), the first mass teeth 178A are pressed circumferentially against the second spacer teeth 160. Referring to FIG. 18C, each first mass tooth 178A may slide axially in a first axial direction (e.g., away from the mass spacer 148 and towards the mass retainer 154 along the structure axis 72) along a respective one of the second spacer teeth 160 so as to disengage (e.g., un-mesh) the first mass teeth 178A from the second spacer teeth 160. During this second operating mode, the spring element 152 is further axially compressed between the first balancing mass 150A and the second balancing mass 150B to a second axial thickness 256 that is smaller than the first axial thickness 250 of FIG. 18A. The first balancing mass 150A may thereby be rotated about the structure axis 72 relative to the mass spacer 148 and, thus, the powerplant nut 76. In addition or alternatively, the second balancing mass 150B may be rotated about the structure axis 72 relative to the mass retainer 154 and, thus, the powerplant nut 76 using a similar methodology as described above. Using this technique with a single one of the balancing masses 150A, 150B (generally referred to as "150") or each of the balancing masses 150, a technician may rotationally balance the powerplant rotating structure 70 from outside of a stationary structure 257 (e.g., see in FIG. 1) while the powerplant rotating structure 70 remains installed within the aircraft powerplant 20 and its gas turbine engine 26. By contrast, using traditional balancing techniques, the powerplant rotating structure 70 would need to be removed from the aircraft powerplant 20 and rebalanced on the balancing rig.

The step 1706 above generally describes the tool 254 as being used to rotate the respective balancing mass (e.g., 150A) about the structure axis 72 as the powerplant rotating structure 70 is held stationary. However, in other embodiments, it is contemplated the tool 254 may be used to hold the respective balancing mass (e.g., 150A) stationary while the powerplant rotating structure 70 is (e.g., manually) rotated about the structure axis 72. In still other embodiments, it is contemplated the respective balancing mass (e.g., 150A) and the powerplant rotating structure 70 may be rotated in opposite directions about the structure axis 72.

Where the powerplant rotating structure 70 is configured as the high speed rotating structure 50, the tool 254 may be passed through an aperture 258 in the low speed shaft 52 in order to gain access to the balancing masses 150. In such embodiments, the tool 254 may be inserted into an internal bore of the low speed shaft 52 from an end of the low speed rotating structure 54 following, for example, removal of a nose cone (or tail cone) and/or a respective shaft end plug.

In some embodiments, referring to FIG. 16, each of the mass weights 176A, 176B (generally referred to as "176") may be configured with a common configuration; e.g., the same shape, size and weight. Moreover, the weights, axial center of gravity locations and/or radial center of gravity locations of the mass weights 176A and 176B may be the same (or substantially the same) to facilitate provision of a neutral balance position. The present disclosure, however, is not limited to such exemplary embodiments. For example, in other embodiments, one or more of the mass weights 176 may be provided with a different configuration than one or more other mass weights 176. One of the mass weights 176, for example, may each be heavier than the other mass weight 176.

Figure 19:
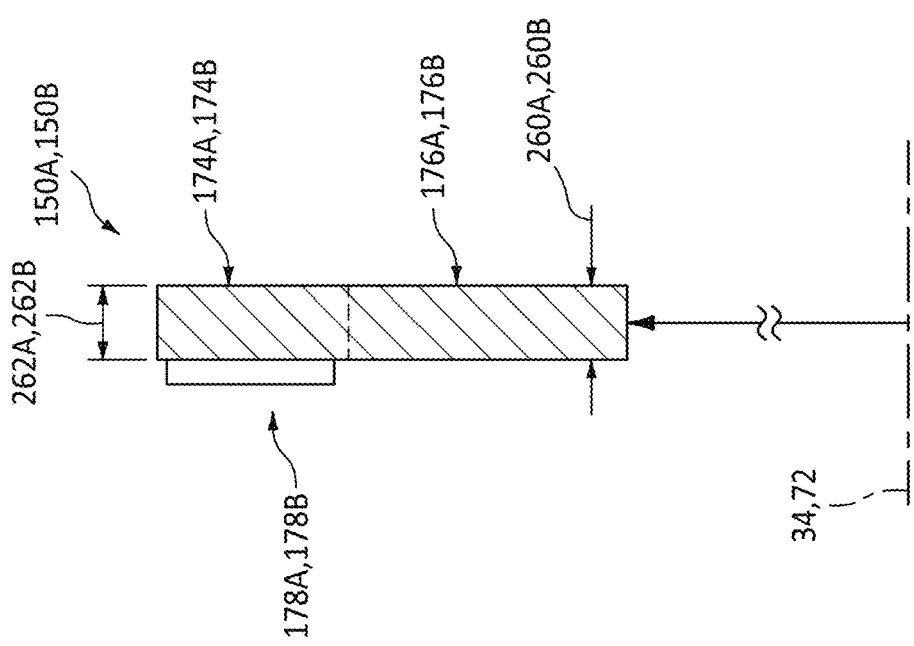
FIG. 19 is a partial sectional illustration of an alternative balancing mass.

In some embodiments, referring to FIGS. 8 and 11, each mass weight 176A, 176B may have an axial thickness 260A, 260B (generally referred to as "260") larger than an axial thickness 262A, 262B (generally referred to as "262") of the respective mass ring 174A, 174B. In other embodiments, referring to FIG. 19, it is contemplated the mass weight thickness 260 may alternatively be equal to the respective mass ring thickness 262.

Figure 20:
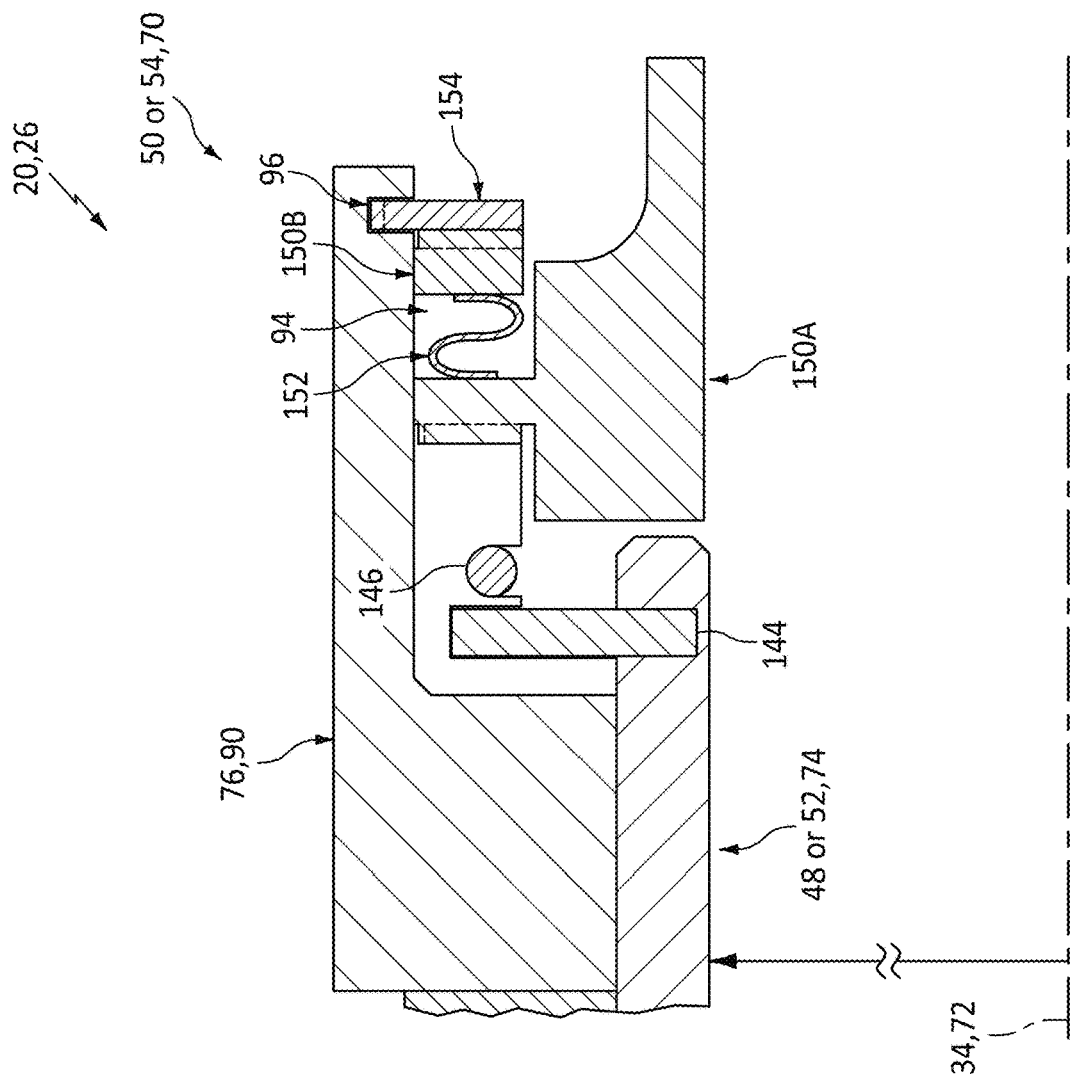
FIG. 20 is a partial sectional illustration of an alternative powerplant rotating structure.

In some embodiments, referring to FIG. 2, the rotating structure balancing device 78 includes the mass spacer 148 axially between the powerplant nut 76 and the first balancing mass 150A as described above. In other embodiments, referring to FIG. 20, the functionality of the mass spacer may be integrated into the powerplant nut 76. In such embodiments, the first balancing mass 150A may axially engage the powerplant nut 76 directly through an axial meshed interface. Moreover, while the mass receptacle 94 and the retainer receptacle 96 are described above as being configured as part of the powerplant nut 76, it is contemplated a similar mass receptacle 94 and retainer receptacle 96 may alternatively be configured as part of the powerplant shaft 74 or another component of the powerplant rotating structure 70.

In some embodiments, some or all of the powerplant rotating structure components in FIG. 2 may be axisymmetric with one another. In other embodiments, one or more of the powerplant rotating structure components may not be axisymmetric with one or more other powerplant rotating structure components.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft powerplant, comprising:
    a rotating structure configured to rotate about an axis, the rotating structure including a bladed rotor, a first component, a second component, a first balancing mass, a second balancing mass and a spring element, wherein the first balancing mass and the second balancing mass are configured to rotationally balance the rotating structure about the axis;
    the first component comprising a plurality of first component teeth;
    the second component comprising a plurality of second component teeth;
    the first balancing mass including a first mass ring and a plurality of first mass teeth, the first mass ring extending circumferentially about the axis, the plurality of first mass teeth arranged circumferentially about the axis and projecting axially out from the first mass ring, and the plurality of first mass teeth meshed with the plurality of first component teeth;

the second balancing mass including a second mass ring and a plurality of second mass teeth, the second mass ring extending circumferentially about the axis, the plurality of second mass teeth arranged circumferentially about the axis and projecting axially out from the second mass ring, and the plurality of second mass teeth meshed with the plurality of second component teeth; and the spring element located axially between and engaged with the first balancing mass and the second balancing mass.

2. The apparatus of claim 1, wherein
the rotating structure further includes a bore; and
the first balancing mass, the second balancing mass and the spring element are disposed in the bore and axially retained between the first component and the second component.

3. The apparatus of claim 2, wherein the second component comprises an annular retainer disposed in the bore.

4. The apparatus of claim 2, wherein
during a first condition when the spring element has a first axial thickness, at least one of the first balancing mass is rotationally repositionable about the axis relative to the first component or the second balancing mass is rotationally repositionable about the axis relative to the second component; and
during a second condition when the spring element has a second axial thickness that is greater than the first axial thickness, the first mass teeth are meshed with the first component teeth to rotationally fix the first balancing mass to the first component and the second mass teeth are meshed with the second component teeth to rotationally fix the second balancing mass to the second component.

5. The apparatus of claim 1, wherein at least one of
the first mass ring has a full-hoop body around the axis; or
the second mass ring has a full-hoop body around the axis.

6. The apparatus of claim 1, wherein at least one of
each of the plurality of first mass teeth has a rounded first mass tooth tip; or
each of the plurality of second mass teeth has a rounded second mass tooth tip.

7. The apparatus of claim 1, wherein at least one of
a first of the plurality of first mass teeth has a first tooth width that decreases as the first of the plurality of first mass teeth projects axially out from the first mass ring to a tip of the first of the plurality of first mass teeth; or
a first of the plurality of second mass teeth has a second tooth width that decreases as the first of the plurality of second mass teeth projects axially out from the second mass ring to a tip of the first of the plurality of second mass teeth.

8. The apparatus of claim 1, wherein at least one of
the first balancing mass further includes a first mass weight projecting radially inward from the first mass ring; or
the second balancing mass further includes a second mass weight projecting radially inward from the second mass ring.

9. The apparatus of claim 1, wherein at least one of
the first balancing mass further includes a first mass weight projecting axially away from the first mass ring in a direction away from the second mass ring; or
the second balancing mass further includes a second mass weight projecting axially away from the second mass ring in a direction away from the first mass ring.

10. The apparatus of claim 1, wherein at least one of
the first balancing mass further includes a first mass weight projecting axially away from the first mass ring in a direction towards the second mass ring; or
the second balancing mass further includes a second mass weight projecting axially away from the second mass ring in a direction towards the first mass ring.

11. The apparatus of claim 1, wherein
the first balancing mass further includes a first mass weight connected to the first mass ring;
the second balancing mass further includes a second mass weight connected to the second mass ring; and
a center of gravity of the first mass weight is axially aligned with a center of gravity of the second mass weight when the plurality of first mass teeth are meshed with the plurality of first component teeth and the plurality of second mass teeth are meshed with the plurality of second component teeth.

12. The apparatus of claim 1, wherein at least one of
the first balancing mass further includes a first mass weight, the first mass weight includes a first weight base and a first weight tab, the first weight base is connected to the first mass ring, and the first weight tab projects axially out from the first weight base; or
the second balancing mass further includes a second mass weight, the second mass weight includes a second weight base and a second weight tab, the second weight base is connected to the second mass ring, and the second weight tab projects axially out from the second weight base.

13. The apparatus of claim 12, wherein
the first balancing mass further includes the first mass weight, and the first weight tab projects axially out from the first weight base in a first axial direction; and
the second balancing mass further includes the second mass weight, and the second weight tab projects axially out from the second weight base in the first axial direction.

14. The apparatus of claim 1, wherein at least one of
the first balancing mass further includes a first mass weight connected to the first mass ring, and an axial thickness of the first mass weight is equal to an axial thickness of the first mass ring; or
the second balancing mass further includes a second mass weight connected to the second mass ring, and an axial thickness of the second mass weight is equal to an axial thickness of the second mass ring.

15. The apparatus of claim 1, wherein
the rotating structure further includes a nut with a bore;
the first component, the second component, the first balancing mass and the second balancing mass are disposed within the bore; and
the first component and the second component are each rotationally fixed to the nut.

16. The apparatus of claim 1, wherein
the first component is configured as a nut with a bore;
the second component, the first balancing mass and the second balancing mass are disposed within the bore; and
the second component is rotationally fixed to the nut.

17. The apparatus of claim 1, wherein
the first component is configured as a shaft with a bore;
the second component, the first balancing mass and the second balancing mass are disposed within the bore; and
the second component is rotationally fixed to the shaft.

18. The apparatus of claim 1, further comprising a compressor section, a combustor section, a turbine section and a flowpath extending through the compressor section, the combustor section and the turbine section, wherein the bladed rotor is disposed in the turbine section or the compressor section.

19. An apparatus for an aircraft powerplant, comprising:
a rotating structure configured to rotate about an axis, the rotating structure including a first component, a second component, a first balancing mass and a spring element, wherein the first balancing mass is configured to rotationally balance the rotating structure about the axis;
the first component comprising a plurality of first component teeth;
the first balancing mass including a first mass ring, a first mass weight and a plurality of first mass teeth, the first mass ring extending circumferentially about the axis, the first mass weight connected to and located radially inboard of the first mass ring, an axial thickness of the first mass weight larger than an axial thickness of the first mass ring, the plurality of first mass teeth arranged circumferentially about the axis and projecting axially out from the first mass ring, and the plurality of first mass teeth meshed with the plurality of first component teeth; and
the spring element configured to axially bias the first mass ring towards the first component and away from the second component.

20. An apparatus for an aircraft powerplant, comprising:
a nut comprising a shoulder and a bore, the bore extending axially along an axis through the nut;
a spacer disposed in the bore and comprising a plurality of spacer teeth;
a first balancing mass disposed in the bore and including a first mass ring and a plurality of first mass teeth, the first mass ring extending circumferentially about the axis, the plurality of first mass teeth arranged circumferentially about the axis and projecting axially out from the first mass ring, and the plurality of first mass teeth meshed with the plurality of spacer teeth;
a spring element disposed in the bore, the spring element configured to axially bias the first mass ring against the spacer; and
a retainer disposed in the bore and mounted to the nut, wherein the spacer, the first balancing mass and the spring element are axially retained within the bore between the shoulder and the retainer.

* * * * *